United States Patent
Kobayashi et al.

(10) Patent No.: US 6,989,946 B2
(45) Date of Patent: Jan. 24, 2006

(54) PROJECTION LENS

(75) Inventors: Takeshi Kobayashi, Sano (JP); Kumajiro Sekine, Sano (JP)

(73) Assignee: Sekinos Co., Ltd., (JP)

( * ) Notice: Subject to any disclaimer, the term of this patent is extended or adjusted under 35 U.S.C. 154(b) by 0 days.

(21) Appl. No.: 10/995,034

(22) Filed: Nov. 23, 2004

(65) Prior Publication Data

US 2005/0122598 A1    Jun. 9, 2005

(30) Foreign Application Priority Data

Nov. 28, 2003  (JP) .............................. 2003-399708
Nov. 22, 2004  (JP) .............................. 2004-337187

(51) Int. Cl.
  G02B 9/00    (2006.01)
  G02B 9/64    (2006.01)
  H04N 5/64    (2006.01)
  H04N 9/31    (2006.01)

(52) U.S. Cl. .................. 359/754; 359/755; 348/744

(58) Field of Classification Search ............... 359/681, 359/691, 733, 740, 754, 755; 353/39, 101; 348/744, 756, 757, 794

See application file for complete search history.

(56) References Cited

U.S. PATENT DOCUMENTS

| | | | | |
|---|---|---|---|---|
| 3,804,493 A * | 4/1974 | Matsubara | .............. | 359/755 |
| 4,682,863 A * | 7/1987 | Simbal | .............. | 359/755 |
| 5,367,405 A | 11/1994 | Sado | .............. | 359/649 |
| 2002/0060858 A1 | 5/2002 | Wada | .............. | 359/739 |
| 2003/0103268 A1 | 6/2003 | Nishikawa et al. | .......... | 359/683 |
| 2004/0233547 A1 | 11/2004 | Sugano | .............. | 359/784 |

FOREIGN PATENT DOCUMENTS

| | | |
|---|---|---|
| JP | 2000-275515 | 10/2000 |
| JP | 2003-5069 | 1/2003 |
| JP | 2003-156683 | 5/2003 |

* cited by examiner

Primary Examiner—Georgia Epps
Assistant Examiner—Alicia M Harrington
(74) Attorney, Agent, or Firm—Bacon & Thomas

(57) ABSTRACT

An object of the present invention is to suppress an influence due to temperature change and various aberrations. It is a projection lens which projects an image on a surface of a screen (magnified side). A first group I having a negative refractive power and a second group II having a positive refractive power are arranged in order from a magnified side toward a reduced side. The first group I is configured to arrange a first lens and a second lens in order from the magnified side, and the second group II is configured to arrange a third lens to a seventh lens. The first and second lenses are a negative meniscus lens whose both surfaces are formed by the aspherical surface in which an area near an optical axis of the surface on the magnified side is a concave surface. The third lens is a cemented lens in which a bi-concave lens is cemented to the surface on the reduced side of a bi-convex lens. The fourth lens is a positive meniscus lens whose both surfaces are formed by the aspherical surface, and a convex surface of the positive meniscus lens faces toward the reduced side. The fifth lens is the cemented lens in which the bi-concave lens is cemented to the surface on the reduced side of the bi-convex lens. The sixth lens is a positive lens whose strong convex surface faces toward the reduced side. The seventh lens is the positive lens whose both surfaces are a convex surface.

7 Claims, 24 Drawing Sheets

FIG. 3

EXAMPLE 1 f = 10.86 mm F/no = 2.41 $B_{FL}$ = 37.577 mm 2ω = 90.1° M = -1/53.21× L = 542.0 mm

| i | Ri | Di | Nd | νd |
|---|---|---|---|---|
| 1 | -684.79948 | 5.7572 | 1.49091 | 58.02 |
| 2 | 225.14001 | 9.7632 | | |
| 3 | -57.65639 | 5.6840 | 1.49091 | 58.02 |
| 4 | 24.13381 | 57.7960 | | |
| 5 | infinity | 17.7466 | | |
| 6 | infinity | 7.5280 | | |
| 7 | 44.31466 | 6.9350 | 1.84666 | 23.78 |
| 8 | -28.47270 | 1.0000 | 1.83400 | 37.35 |
| 9 | 162.03631 | 6.7922 | | |
| 10 | -47.22374 | 4.1057 | 1.49091 | 58.02 |
| 11 | -37.08705 | 0.1500 | | |
| 12 | 271.92708 | 7.1524 | 1.48749 | 70.45 |
| 13 | -21.31781 | 1.0000 | 1.84666 | 23.78 |
| 14 | 48.18104 | 0.3045 | | |
| 15 | 54.99960 | 10.3975 | 1.48749 | 70.45 |
| 16 | -28.87752 | 0.3347 | | |
| 17 | 69.86705 | 9.7531 | 1.48749 | 70.45 |
| 18 | -34.01361 | 2.2000 | | |
| 19 | infinity | 37.0000 | | |
| 20 | infinity | 4.0000 | 1.51680 | 64.20 |
| 21 | infinity | 2.3000 | | |
| 22 | infinity | 2.3000 | 1.51680 | 64.20 |
| 23 | infinity | 5.5000 | | |

| ASPHERIC COEFFICIENT | FIRST SURFACE | SECOND SURFACE | THIRD SURFACE |
|---|---|---|---|
| K | -4.73815457E+01 | -4.05663357E+02 | -1.76783409E-01 |
| A3 | -4.74588508E-06 | 5.91078165E-06 | 1.94342806E-05 |
| A4 | -6.36632738E-06 | 7.10621790E-07 | 8.37231588E-05 |
| A5 | 1.30113823E-06 | 7.93258092E-08 | -1.69216010E-06 |
| A6 | -3.73993988E-08 | 8.91864168E-08 | -7.54701842E-08 |
| A7 | 5.87429030E-12 | -2.64912404E-09 | 6.85011802E-10 |
| A8 | 9.14533305E-12 | -2.22915834E-11 | 6.14604289E-11 |
| A9 | -1.43061977E-14 | 1.68198751E-13 | -3.52861536E-13 |
| A10 | -8.58182715E-16 | 2.14095605E-14 | -1.34911829E-14 |

| ASPHERIC COEFFICIENT | FOURTH SURFACE | TENTH SURFACE | ELEVENTH SURFACE |
|---|---|---|---|
| K | -2.61660160E-02 | -2.31737466E+01 | -2.32706202E+00 |
| A3 | -3.80562567E-05 | 0 | 0 |
| A4 | 8.90085469E-05 | -1.04803545E-05 | 2.69993958E-05 |
| A5 | -4.64362011E-07 | 1.99414138E-06 | 3.49183978E-07 |
| A6 | 3.35145098E-08 | 4.91069529E-08 | 1.40642946E-07 |
| A7 | -2.25280961E-10 | 3.60825170E-11 | -8.51188862E-09 |
| A8 | 2.16209108E-10 | -2.48198880E-11 | -2.72830837E-11 |
| A9 | 5.02107100E-11 | 4.07068697E-12 | 7.40926498E-11 |
| A10 | -1.29935015E-12 | -1.46074422E-12 | -4.51551319E-12 |

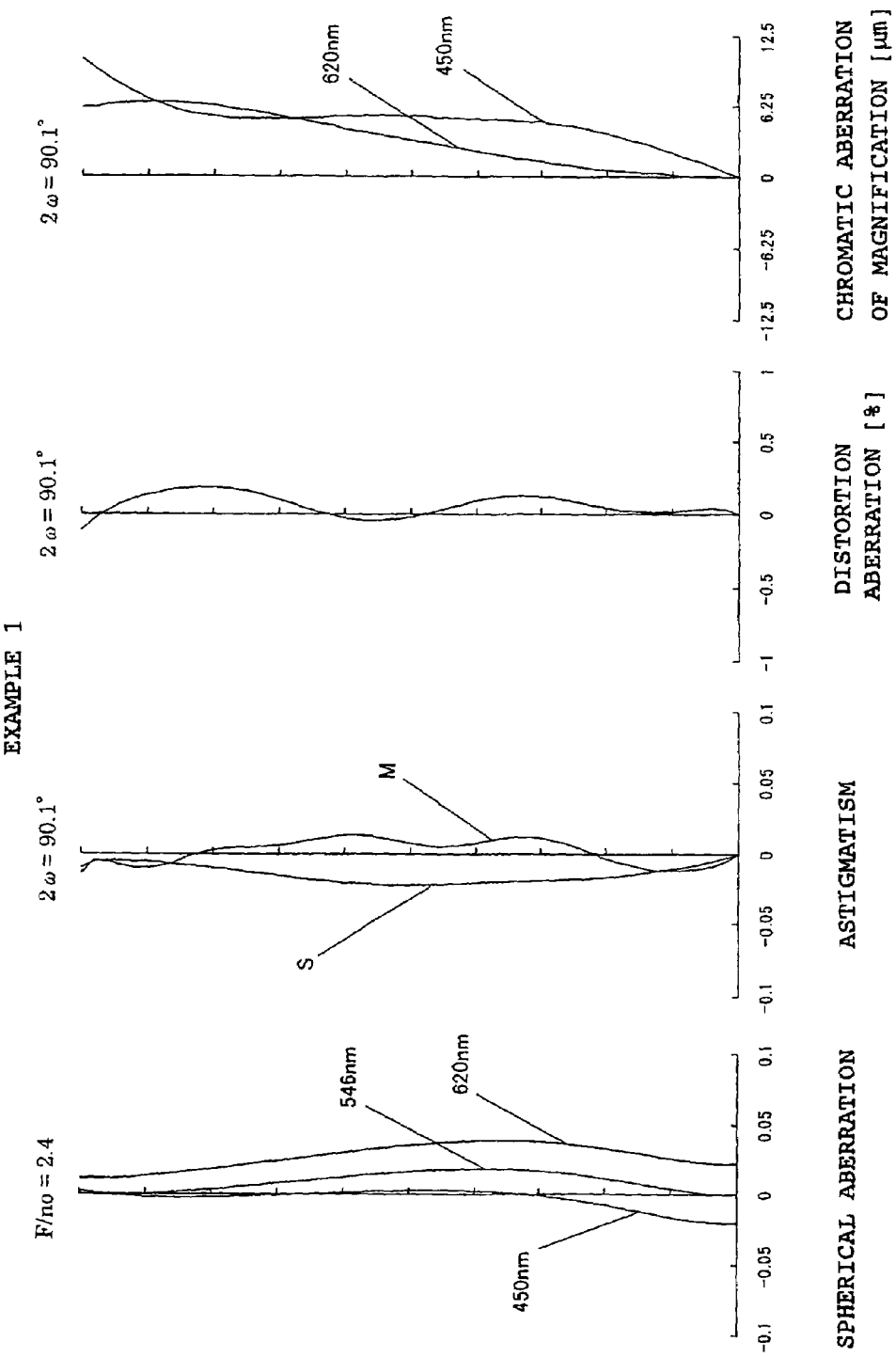

FIG. 5

EXAMPLE 2  $f = 10.76$ mm  $F/no = 2.41$  $B_{FL} = 37.581$ mm  $2\omega = 91.1°$  $M = -1/74.74 \times$  $L = 768.0$ mm

| i | Ri | Di | Nd | νd |
|---|---|---|---|---|
| 1 | -684.79948 | 5.7572 | 1.49091 | 58.02 |
| 2 | 226.14001 | 9.7632 | | |
| 3 | -58.59409 | 5.6840 | 1.49091 | 58.02 |
| 4 | 23.44948 | 57.7960 | | |
| 5 | infinity | 17.7466 | | |
| 6 | infinity | 7.5242 | | |
| 7 | 44.31466 | 6.9350 | 1.84666 | 23.78 |
| 8 | -28.47270 | 1.0000 | 1.83400 | 37.35 |
| 9 | 162.03631 | 6.7922 | | |
| 10 | -47.22374 | 4.1057 | 1.49091 | 58.02 |
| 11 | -37.08705 | 0.1500 | | |
| 12 | 271.92708 | 7.1524 | 1.48749 | 70.45 |
| 13 | -21.31781 | 1.0000 | 1.84666 | 23.78 |
| 14 | 48.18104 | 0.3045 | | |
| 15 | 54.99960 | 10.3975 | 1.48749 | 70.45 |
| 16 | -28.87752 | 0.3347 | | |
| 17 | 69.86705 | 9.7531 | 1.48749 | 70.45 |
| 18 | -34.01361 | 2.2000 | | |
| 19 | infinity | 37.0000 | 1.51680 | 64.20 |
| 20 | infinity | 4.0000 | | |
| 21 | infinity | 2.3000 | 1.51680 | 64.20 |
| 22 | infinity | 5.5038 | | |
| 23 | infinity | | | |

| ASPHERIC COEFFICIENT | FIRST SURFACE | SECOND SURFACE | THIRD SURFACE |
|---|---|---|---|
| K | -4.73815457E+01 | -4.05663357E+02 | 1.68935358E-01 |
| A3 | -4.74588508E-06 | 5.91078165E-06 | -2.19104268E-05 |
| A4 | -6.36632738E-06 | 7.10621790E-07 | 8.62569674E-05 |
| A5 | 1.30113823E-06 | 7.93258092E-08 | -1.67595030E-06 |
| A6 | -3.73993988E-08 | 8.91864168E-08 | -7.83619977E-08 |
| A7 | 5.87429030E-12 | -2.64912404E-09 | 6.41979700E-10 |
| A8 | 9.14533305E-12 | -2.22915834E-11 | 6.33667132E-11 |
| A9 | -1.43061977E-14 | 1.68198751E-13 | -2.68740800E-13 |
| A10 | -8.58182715E-16 | 2.14095605E-14 | -1.55460540E-14 |

| ASPHERIC COEFFICIENT | FOURTH SURFACE | TENTH SURFACE | ELEVENTH SURFACE |
|---|---|---|---|
| K | -9.63513533E-02 | -2.31737466E+01 | -2.32706202E+00 |
| A3 | -5.83106241E-05 | 0 | 0 |
| A4 | 8.28595508E-05 | -1.04803545E-05 | 2.69993958E-05 |
| A5 | 4.75723534E-07 | 1.99414138E-06 | 3.49183978E-07 |
| A6 | 1.17227855E-08 | 4.91069529E-08 | 1.40642946E-07 |
| A7 | -2.34970856E-08 | 3.60825170E-11 | -8.51188862E-09 |
| A8 | 2.18725597E-10 | -2.48198880E-11 | -2.72830837E-11 |
| A9 | 5.17263916E-11 | 4.07068697E-12 | 7.40926498E-11 |
| A10 | -1.30895834E-12 | -1.46074422E-12 | -4.51551319E-12 |

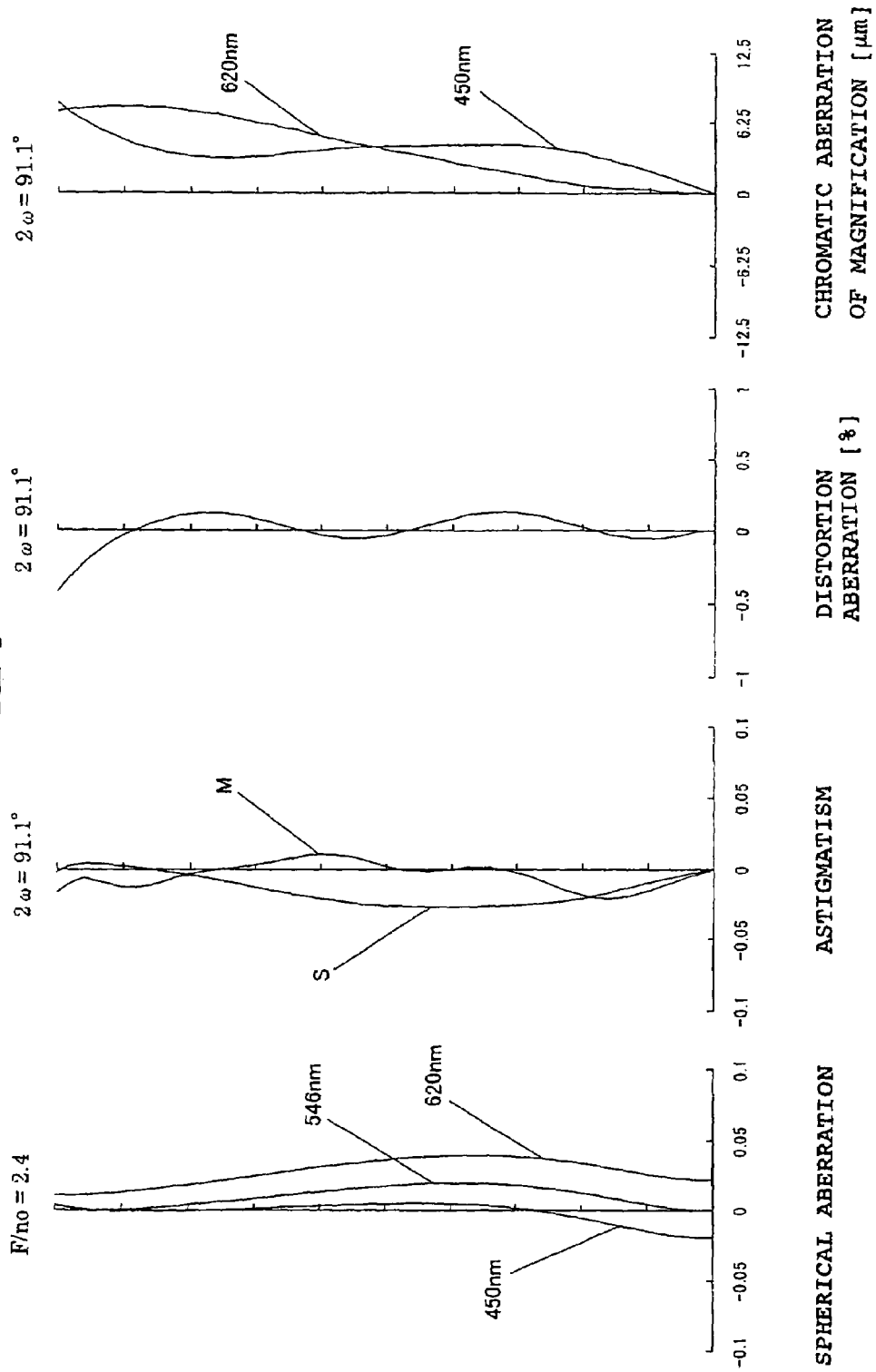

FIG. 8

EXAMPLE 3 $f=10.83mm$ $F/no=2.40$ $B_{FL}=37.577mm$ $2\omega=90.1°$ $M=-1/53.30 \times L=542.0mm$

| i | Ri | Di | Nd | νd |
|---|---|---|---|---|
| 1 | -128.68246 | 5.5957 | 1.49091 | 58.02 |
| 2 | -564.99411 | 10.0000 | | |
| 3 | -49.73139 | 5.8000 | 1.49091 | 58.02 |
| 4 | 25.83294 | 57.6044 | | |
| 5 | infinity | 16.0000 | | |
| 6 | infinity | 10.0000 | | |
| 7 | 39.96463 | 9.3193 | 1.80518 | 25.46 |
| 8 | -19.13456 | 1.0000 | 1.83400 | 37.35 |
| 9 | 130.60013 | 5.4399 | | |
| 10 | -45.36870 | 3.2000 | 1.49091 | 58.02 |
| 11 | -36.34811 | 0.2624 | | |
| 12 | 176.05420 | 7.7420 | 1.48749 | 70.45 |
| 13 | -21.27189 | 1.0000 | 1.84666 | 23.78 |
| 14 | 48.18104 | 0.3350 | | |
| 15 | 54.99960 | 9.4002 | 1.48749 | 70.45 |
| 16 | -27.25135 | 0.1500 | | |
| 17 | 46.82384 | 9.3513 | 1.48749 | 70.45 |
| 18 | -46.82384 | 5.0000 | | |
| 19 | infinity | 37.0000 | 1.51680 | 64.20 |
| 20 | infinity | 4.0000 | | |
| 21 | infinity | 2.3000 | 1.51680 | 64.20 |
| 22 | infinity | 2.7000 | | |
| 23 | infinity | | | |

| ASPHERIC COEFFICIENT | FIRST SURFACE | SECOND SURFACE | THIRD SURFACE |
|---|---|---|---|
| K | 0 | 0 | 0 |
| A3 | 0 | 0 | 0 |
| A4 | -2.263363653E-06 | 8.078165355E-07 | 9.465378665E-05 |
| A5 | 1.217912155E-06 | 1.170795095E-08 | -3.801046695E-06 |
| A6 | -3.743634915E-08 | 9.048351185E-08 | 1.557616955E-07 |
| A7 | 1.627843545E-11 | -2.625687215E-09 | -1.266646385E-08 |
| A8 | 9.407524075E-12 | -2.085157855E-11 | 4.782099805E-10 |
| A9 | -1.030728575E-14 | 2.314926625E-13 | -6.953643505E-12 |
| A10 | -9.696411125E-16 | 2.149372325E-14 | 2.741657855E-14 |

| ASPHERIC COEFFICIENT | FOURTH SURFACE | TENTH SURFACE | ELEVENTH SURFACE |
|---|---|---|---|
| K | 0 | -1.237022535E+01 | -3.556010895E+00 |
| A3 | 0 | 0 | 0 |
| A4 | 8.646651835E-05 | 9.459701405E-06 | 2.366996915E-05 |
| A5 | 6.075343045E-07 | 4.650144265E-07 | -3.623260065E-07 |
| A6 | -3.747524465E-07 | 9.070900495E-08 | 1.812469405E-07 |
| A7 | 4.830905715E-08 | 3.536229555E-09 | -5.623369575E-09 |
| A8 | -5.166750505E-09 | -1.474644755E-10 | -2.207856345E-10 |
| A9 | 2.358893375E-10 | -1.785133635E-11 | 4.495384655E-11 |
| A10 | -3.688439605E-12 | 4.232520285E-13 | -2.091104755E-12 |

EXAMPLE 3

FIG. 10

EXAMPLE 4  f=10.72mm  F/no=2.41  B$_{FL}$=37.582mm  2ω=91.1°  M=-1/74.91×  L=768.0mm

| i | Ri | Di | Nd | νd |
|---|---|---|---|---|
| 1 | -128.68246 | 5.5957 | 1.49091 | 58.02 |
| 2 | -564.99411 | 10.0000 | | |
| 3 | -49.7068 | 5.8000 | 1.49091 | 58.02 |
| 4 | 25.22767 | 57.6044 | | |
| 5 | infinity | 16.0000 | | |
| 6 | infinity | 9.9951 | | |
| 7 | 39.96463 | 9.3193 | 1.80518 | 25.46 |
| 8 | -19.13456 | 1.0000 | 1.83400 | 37.35 |
| 9 | 130.60013 | 5.4399 | | |
| 10 | -45.36870 | 3.2000 | 1.49091 | 58.02 |
| 11 | -36.34811 | 0.2624 | | |
| 12 | 176.05420 | 7.7420 | 1.48749 | 70.45 |
| 13 | -21.27189 | 1.0000 | 1.84666 | 23.78 |
| 14 | 48.18104 | 0.3350 | | |
| 15 | 54.99960 | 9.4002 | 1.48749 | 70.45 |
| 16 | -27.25135 | 0.1500 | | |
| 17 | 46.82384 | 9.3513 | 1.48749 | 70.45 |
| 18 | -46.82384 | 5.0000 | | |
| 19 | infinity | 37.0000 | 1.51680 | 64.20 |
| 20 | infinity | 4.0000 | | |
| 21 | infinity | 2.3000 | 1.51680 | 64.20 |
| 22 | infinity | 2.7049 | | |
| 23 | infinity | | | |

| ASPHERIC COEFFICIENT | FIRST SURFACE | SECOND SURFACE | THIRD SURFACE |
|---|---|---|---|
| K | 0 | 0 | 0 |
| A3 | 0 | 0 | 0 |
| A4 | -2.26333653E-06 | 8.07816535E-07 | 1.01191525E-04 |
| A5 | 1.21791215E-06 | 1.17079509E-08 | -4.69025015E-06 |
| A6 | -3.74363491E-08 | 9.04835118E-08 | 2.12279306E-07 |
| A7 | 1.62784354E-11 | -2.62568721E-09 | -1.48913411E-08 |
| A8 | 9.40752407E-12 | -2.08515785E-11 | 5.36230833E-10 |
| A9 | -1.03072857E-14 | 2.31492662E-13 | -7.92276095E-12 |
| A10 | -9.69641112E-16 | 2.14937232E-14 | 3.54043115E-14 |

| ASPHERIC COEFFICIENT | FOURTH SURFACE | TENTH SURFACE | ELEVENTH SURFACE |
|---|---|---|---|
| K | 0 | -1.23702253E+01 | -3.55601089E+00 |
| A3 | 0 | 0 | 0 |
| A4 | 9.41851938E-05 | 9.45970140E-06 | 2.36669691E-05 |
| A5 | -1.52001492E-06 | 4.65014426E-07 | -3.62326006E-07 |
| A6 | 6.36552407E-08 | 9.07090049E-08 | 1.81246940E-07 |
| A7 | -4.86933536E-09 | 3.53623955E-09 | -5.62336957E-09 |
| A8 | -1.70979824E-09 | -1.47464475E-10 | -2.20785634E-10 |
| A9 | 1.21543218E-10 | -1.78513363E-11 | 4.49583846E-11 |
| A10 | -2.17591224E-12 | 4.23252028E-13 | -2.09110475E-12 |

EXAMPLE 4

EXAMPLE 5

FIG. 13

EXAMPLE 5    f=8.50mm    F/no=2.3    $B_{FL}$=32.270mm    2ω=92.5°    M=−1/81.7X    L=660.42mm

| i | Ri | Di | Nd | vd |
|---|---|---|---|---|
| 1 | −46.4042 | 5.300 | 1.49091 | 58.02 |
| 2 | −250.9463 | 9.271 | | |
| 3 | −84.3550 | 4.000 | 1.49091 | 58.02 |
| 4 | 21.0437 | 67.350 | | |
| 5 | ∞ | 7.150 | | |
| 6 | 25.9213 | 7.075 | 1.84666 | 23.78 |
| 7 | −18.8791 | 1.000 | 1.83400 | 37.35 |
| 8 | 37.4006 | 2.200 | | |
| 9 | −79.2769 | 2.800 | 1.49091 | 58.02 |
| 10 | −49.8634 | 0.100 | | |
| 11 | 110.8800 | 6.790 | 1.48749 | 70.45 |
| 12 | −13.7702 | 1.000 | 1.84666 | 23.78 |
| 13 | 38.6241 | 0.134 | | |
| 14 | 41.5979 | 8.363 | 1.48749 | 70.45 |
| 15 | −20.0375 | 0.100 | | |
| 16 | 43.8535 | 7.200 | 1.48749 | 70.45 |
| 17 | −33.4288 | 5.800 | | |
| 18 | ∞ | 28.000 | 1.51680 | 64.20 |
| 19 | ∞ | 5.000 | | |
| 20 | ∞ | 1.200 | 1.51680 | 64.20 |
| 21 | ∞ | 2.900 | | |
| 22 | ∞ | 0.000 | | |

| ASPHERIC COEFFICIENT | FIRST SURFACE | SECOND SURFACE | THIRD SURFACE |
|---|---|---|---|
| K | −1.3434956E+01 | −7.25036619E+02 | 1.0699545E+00 |
| A3 | 3.9942474E−04 | 3.39942599E−04 | −4.0223641E−04 |
| A4 | −3.0584435E−05 | −2.6984070E−06 | 1.6831037E−04 |
| A5 | 3.4573340E−06 | −9.99369810E−07 | −4.4075402E−06 |
| A6 | −1.2302339E−07 | 3.13988941E−07 | −2.4848966E−07 |
| A7 | 1.5377367E−10 | −1.08554453E−08 | 3.1792443E−09 |
| A8 | 5.2539112E−11 | −1.13287080E−10 | 3.4396604E−10 |
| A9 | −1.2410532E−13 | 1.36500290E−12 | −2.5899459E−12 |
| A10 | −1.0046823E−14 | 2.07959780E−13 | −1.2794281E−13 |
| A11 | −7.1996685E−17 | −6.24207180E−16 | −2.9164952E−16 |
| A12 | −1.5218861E−18 | −4.82714940E−17 | −1.2533586E−17 |
| A13 | −2.6470358E−21 | | −6.7585997E−20 |
| A14 | 1.9727030E−21 | | 2.7634692E−20 |

| ASPHERIC COEFFICIENT | FOURTH SURFACE | TENTH SURFACE | ELEVENTH SURFACE |
|---|---|---|---|
| K | 8.9312306E−02 | −3.09338730E+01 | −1.0973441E+00 |
| A3 | −3.6267109E−04 | 0.0000000E+00 | 0.0000000E+00 |
| A4 | 1.6296798E−04 | 2.93503470E−05 | 5.0436587E−05 |
| A5 | −3.2966443E−06 | 1.00505730E−06 | 6.0785670E−07 |
| A6 | 3.8754524E−07 | 1.57499500E−07 | 2.9396060E−07 |
| A7 | −9.3689545E−08 | −1.86250260E−10 | −3.2785145E−08 |
| A8 | 9.4394839E−10 | −5.48415170E−10 | 3.4061846E−10 |
| A9 | 3.4268710E−10 | 4.38419240E−12 | 4.8628868E−10 |
| A10 | −1.2055991E−11 | −5.35209520E−13 | −4.5842455E−11 |
| A11 | −2.4121909E−15 | 8.98306520E−13 | −6.9415788E−13 |
| A12 | 3.0770948E−16 | −8.08281240E−15 | 9.9295229E−14 |
| A13 | 2.1232544E−17 | −9.83901510E−15 | 1.9773840E−14 |
| A14 | 3.3546850E−18 | 4.47086980E−16 | −1.4572254E−15 |

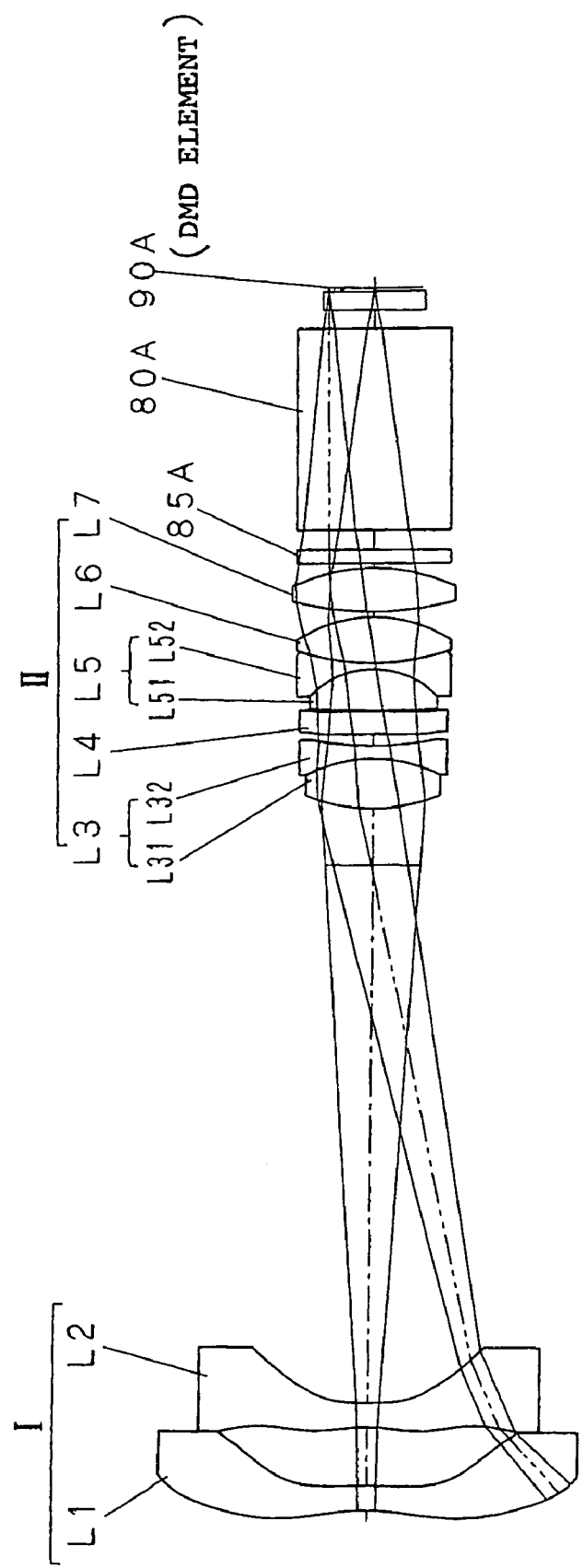

| i | Ri | Di | Nd | vd |
|---|---|---|---|---|
| 1 | −29.3417 | 4.000 | 1.49091 | 58.02 |
| 2 | −97.6901 | 9.490 | | |
| 3 | −21.2126 | 4.000 | 1.49091 | 58.02 |
| 4 | 95.6999 | 86.495 | | |
| 5 | ∞ | 9.000 | | |
| 6 | 26.9330 | 8.000 | 1.84666 | 23.78 |
| 7 | −22.2007 | 2.000 | 1.83400 | 37.35 |
| 8 | 47.2635 | 1.903 | | |
| 9 | −163.1581 | 3.672 | 1.49091 | 58.02 |
| 10 | −83.3328 | 0.100 | | |
| 11 | 198.3670 | 6.533 | 1.48749 | 70.45 |
| 12 | −136.748 | 1.000 | 1.84666 | 23.78 |
| 13 | 35.8974 | 0.070 | | |
| 14 | 37.2155 | 7.412 | 1.48749 | 70.45 |
| 15 | −21.2052 | 0.838 | | |
| 16 | 48.2530 | 6.980 | 1.48749 | 58.50 |
| 17 | −29.8183 | 0.770 | | |
| 18 | ∞ | 2.000 | 1.52300 | |
| 19 | ∞ | 3.150 | | |
| 20 | ∞ | 33.000 | 1.62004 | 36.30 |
| 21 | ∞ | 3.000 | | |
| 22 | ∞ | 3.000 | 1.48700 | 65.60 |
| 23 | ∞ | 0.480 | | |
| 24 | ∞ | | | |

| ASPHERIC COEFFICIENT | FIRST SURFACE | SECOND SURFACE | THIRD SURFACE |
|---|---|---|---|
| K | −6.8369630E+00 | −3.2617360E+02 | −3.9905120E+00 |
| A3 | 4.2801443E−04 | 3.1778285E−04 | −2.4902087E−04 |
| A4 | −4.6912606E−05 | −1.7656198E−05 | 3.2148022E−04 |
| A5 | 7.6868656E−06 | −1.8838744E−06 | −9.8343900E−06 |
| A6 | −3.3028620E−07 | 8.9522929E−07 | −6.9216227E−07 |
| A7 | 3.7210629E−10 | −3.3165635E−08 | 9.5162081E−09 |
| A8 | 2.0235797E−10 | −4.4260414E−10 | 1.3474575E−09 |
| A9 | −7.7457198E−13 | 2.6327770E−12 | −1.2658171E−11 |
| A10 | −5.8999032E−14 | 1.0470595E−12 | −7.4025626E−13 |
| A11 | −2.7354766E−16 | −7.8849603E−15 | −1.0958540E−15 |
| A12 | −3.9283115E−19 | −2.1550225E−16 | −5.6868546E−17 |
| A13 | 1.7739752E−19 | 1.5658726E−18 | 1.4146265E−18 |
| A14 | 6.8091793E−21 | 8.6700300E−20 | 2.7582161E−19 |

| ASPHERIC COEFFICIENT | FOURTH SURFACE | TENTH SURFACE | ELEVENTH SURFACE |
|---|---|---|---|
| K | −1.1420970E+02 | −6.3783550E+01 | −2.1090010E+01 |
| A3 | −1.6945132E−04 | 6.9927591E−05 | 5.6280333E−05 |
| A4 | 3.0252213E−04 | 3.3848881E−05 | 5.0759209E−05 |
| A5 | −1.0612237E−06 | −9.1871948E−07 | −2.1722766E−06 |
| A6 | 1.0170185E−06 | 2.9421627E−07 | 8.9109213E−07 |
| A7 | −3.1509145E−07 | 1.4814631E−08 | −1.1929029E−07 |
| A8 | 3.1728427E−09 | −9.4045666E−10 | 4.9050170E−10 |
| A9 | 1.6350989E−09 | −1.2143932E−10 | −2.5352985E−09 |
| A10 | −7.0799538E−11 | −3.1167316E−11 | −2.3374530E−10 |
| A11 | 9.8440696E−14 | 4.1633364E−12 | −4.0169405E−12 |
| A12 | 1.1503691E−14 | 2.1757497E−13 | 3.5543049E−13 |
| A13 | 4.9795274E−16 | −4.2518421E−14 | 1.0411212E−13 |
| A14 | 2.5577687E−18 | 1.5244645E−15 | −5.8013565E−15 |

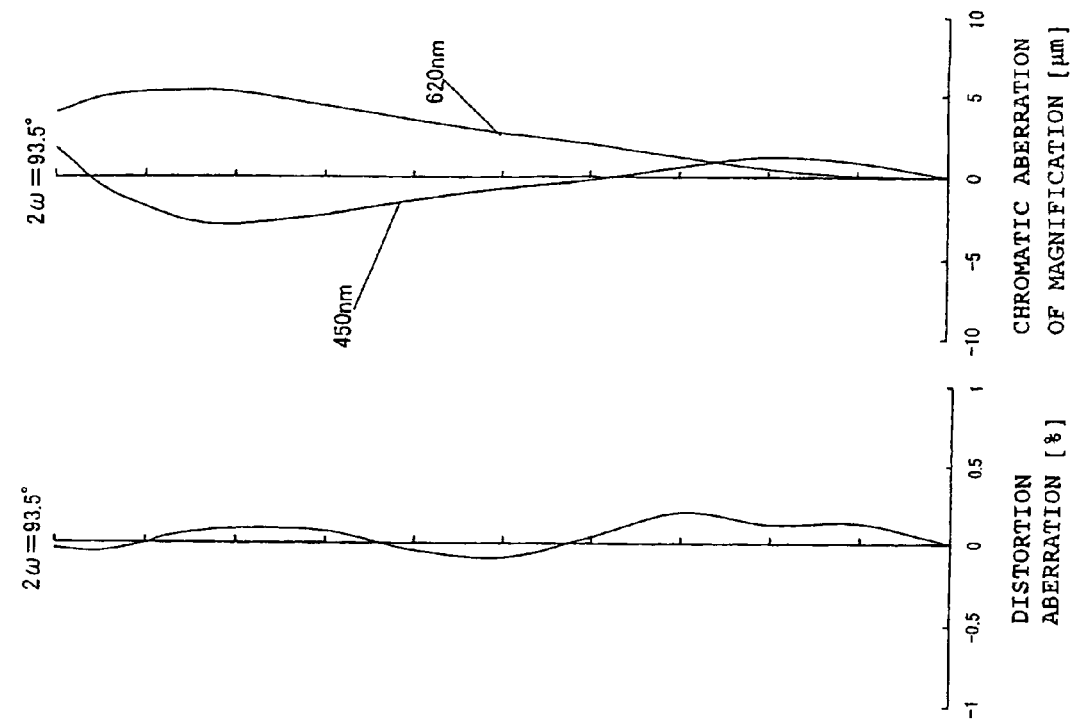
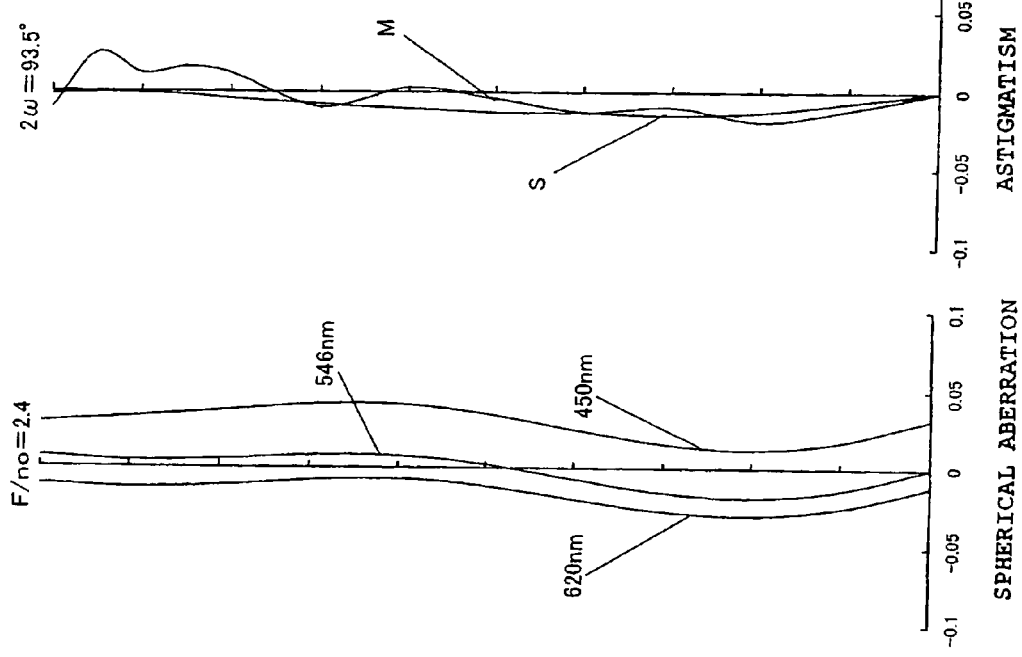
FIG. 17

| i | Ri | Di | Nd | vd |
|---|---|---|---|---|
| 1 | -133.2734 | 6.800 | 1.49091 | 58.02 |
| 2 | -74.6274 | 10.708 | | |
| 3 | -30.3859 | 5.040 | 1.49091 | 58.02 |
| 4 | 26.7440 | 85.042 | | |
| 5 | ∞ | 14.000 | | |
| 6 | 29.6769 | 8.039 | 1.84666 | 23.78 |
| 7 | -35.9970 | 1.000 | 1.83400 | 37.35 |
| 8 | 45.8269 | 4.680 | | |
| 9 | -82.5380 | 3.400 | 1.49091 | 58.02 |
| 10 | -56.4627 | 0.128 | | |
| 11 | 48.1024 | 7.083 | 1.48749 | 70.45 |
| 12 | -19.3201 | 1.253 | 1.84666 | 23.78 |
| 13 | 39.9001 | 0.270 | | |
| 14 | 42.9372 | 9.500 | 1.48749 | 70.45 |
| 15 | -27.0510 | 1.000 | | |
| 16 | 35.0560 | 8.767 | 1.48749 | 70.45 |
| 17 | -126.0631 | 0.770 | | |
| 18 | ∞ | 2.000 | 1.52514 | 33.84 |
| 19 | ∞ | 3.150 | | |
| 20 | ∞ | 33.000 | 1.62004 | 36.30 |
| 21 | ∞ | 3.000 | | |
| 22 | ∞ | 3.000 | 1.48878 | 64.20 |
| 23 | ∞ | 0.480 | | |
| 24 | ∞ | | | |

| ASPHERIC COEFFICIENT | FIRST SURFACE | SECOND SURFACE | THIRD SURFACE |
|---|---|---|---|
| K | -7.4920835E+00 | -1.5606631E+02 | -4.8557099E+00 |
| A3 | -3.5886072E-05 | -2.8907576E-04 | 8.2025365E-04 |
| A4 | 2.7260920E-06 | 2.3360592E-05 | 5.0930558E-05 |
| A5 | 1.2311631E-06 | -3.4198491E-07 | -1.7583078E-06 |
| A6 | -4.0113956E-08 | 9.0466387E-08 | -7.0201794E-08 |
| A7 | -9.1231076E-11 | -2.7686502E-09 | 9.6202528E-10 |
| A8 | 1.0386409E-11 | -2.4301611E-11 | 6.6806525E-11 |
| A9 | 3.1763748E-14 | 2.0231307E-13 | -4.8666357E-13 |
| A10 | -9.4888347E-17 | 2.7600242E-14 | -1.8861549E-14 |
| A11 | -6.2107959E-18 | 3.4374566E-17 | -4.1505172E-17 |
| A12 | -4.9195621E-19 | -8.2857540E-20 | -1.5516001E-19 |
| A13 | -1.2493325E-20 | -3.4239994E-20 | 2.5290047E-20 |
| A14 | 3.0319671E-22 | -3.1087155E-21 | 1.3718244E-21 |

| ASPHERIC COEFFICIENT | FOURTH SURFACE | TENTH SURFACE | ELEVENTH SURFACE |
|---|---|---|---|
| K | -3.0282424E+00 | -6.3107917E+01 | -2.1155393E+01 |
| A3 | 1.3161191E-03 | 2.6556980E-05 | -1.3054714E-06 |
| A4 | 1.2734795E-04 | 4.5383590E-06 | 1.7964491E-05 |
| A5 | -4.7038847E-06 | 3.5920625E-07 | -1.5648423E-06 |
| A6 | 1.2969254E-07 | 9.2121829E-08 | 2.3286232E-07 |
| A7 | -2.6220023E-08 | 6.8742501E-09 | 8.5911416E-10 |
| A8 | 1.8305533E-10 | -4.3252110E-11 | -9.3244721E-11 |
| A9 | 6.2999308E-11 | -6.3613092E-11 | 2.4213799E-11 |
| A10 | -1.0992544E-12 | -2.4163864E-12 | -9.5359200E-12 |
| A11 | -1.0767808E-15 | 2.9853470E-13 | 7.5519037E-15 |
| A12 | -8.4119616E-16 | 2.6304877E-14 | 3.8721026E-14 |
| A13 | -3.8846064E-17 | -6.7094403E-16 | 3.7001310E-15 |
| A14 | 2.0220521E-18 | -7.3445392E-17 | -2.9900407E-16 |

| i | Ri | Di | Nd | νd |
|---|---|---|---|---|
| 1 | -45.9245 | 5.800 | 1.49091 | 58.02 |
| 2 | -169.8532 | 14.000 | | |
| 3 | -27.6234 | 4.400 | 1.49091 | 58.02 |
| 4 | 86.9216 | 98.102 | | |
| 5 | ∞ | 14.000 | | |
| 6 | 36.2332 | 8.021 | 1.84666 | 23.78 |
| 7 | -24.4629 | 1.000 | 1.83400 | 37.35 |
| 8 | 76.4291 | 6.500 | | |
| 9 | -155.4984 | 3.549 | 1.49091 | 58.02 |
| 10 | -88.8879 | 0.100 | | |
| 11 | 347.7232 | 7.200 | 1.48749 | 70.45 |
| 12 | -19.7157 | 1.000 | 1.84666 | 23.78 |
| 13 | 404.120 | 0.105 | | |
| 14 | 42.3934 | 8.116 | 1.48749 | 70.45 |
| 15 | -28.0744 | 0.100 | | |
| 16 | 45.5270 | 7.008 | 1.48749 | 70.45 |
| 17 | -47.7423 | 3.000 | 1.64769 | 33.84 |
| 18 | ∞ | 27.000 | | |
| 19 | ∞ | 4.140 | 1.51680 | 64.20 |
| 20 | ∞ | 22.000 | 1.84861 | 24.60 |
| 21 | ∞ | 0.500 | | |
| 22 | ∞ | 0.550 | 1.51680 | 64.20 |
| 23 | ∞ | 3.700 | | |
| 24 | ∞ | 1.050 | 1.51680 | 64.20 |
| 25 | ∞ | 0.100 | | |
| 26 | ∞ | | | |

| ASPHERIC COEFFICIENT | FIRST SURFACE | SECOND SURFACE | THIRD SURFACE |
|---|---|---|---|
| K | -6.8369630E+00 | -3.2617360E+02 | -3.9905120E+00 |
| A3 | 4.3879657E-04 | 4.6793793E-04 | 3.4346665E-04 |
| A4 | -1.8836758E-05 | -5.2949881E-06 | 9.4825769E-05 |
| A5 | 1.9246573E-06 | -1.1478310E-06 | -2.9135605E-06 |
| A6 | -6.9814798E-08 | 1.9528650E-07 | -1.4331241E-07 |
| A7 | 2.3194993E-10 | -5.0822108E-09 | 2.2964211E-09 |
| A8 | 2.6544728E-11 | -5.4825569E-11 | 1.8453145E-10 |
| A9 | -1.5888121E-13 | 4.0059427E-14 | -1.9013021E-12 |
| A10 | -5.6511957E-15 | 8.0217181E-14 | -7.7690671E-14 |
| A11 | -4.6129768E-18 | -3.7531793E-16 | -6.2677626E-17 |
| A12 | 6.0309668E-19 | -7.6825008E-18 | 9.8064420E-18 |
| A13 | 1.4145355E-20 | -1.6933178E-19 | 5.4697342E-19 |
| A14 | -4.5575663E-23 | 5.8872912E-21 | -4.6516970E-21 |

| ASPHERIC COEFFICIENT | FOURTH SURFACE | TENTH SURFACE | ELEVENTH SURFACE |
|---|---|---|---|
| K | -1.1420970E+02 | -6.3783550E+01 | -2.1090010E+01 |
| A3 | 2.4432128E-04 | 2.1315024E-05 | -2.3694704E-06 |
| A4 | 1.3604604E-04 | -1.0713688E-06 | 1.7730996E-05 |
| A5 | -4.5486781E-06 | 1.0374379E-06 | -3.5473461E-06 |
| A6 | 4.2589994E-07 | -9.1075009E-08 | 5.4475594E-07 |
| A7 | -5.5328950E-08 | 1.1638721E-08 | -2.4815858E-08 |
| A8 | 3.3386089E-10 | -2.9002689E-10 | -1.5096100E-09 |
| A9 | 1.6860839E-10 | -2.9933457E-11 | 2.2042764E-10 |
| A10 | -5.6756846E-12 | -1.9502097E-12 | -9.9166731E-12 |
| A11 | 1.0138821E-14 | 2.8359563E-13 | 1.4749410E-13 |
| A12 | 5.7496797E-16 | 1.4531659E-14 | 7.3002294E-15 |
| A13 | 7.0720734E-18 | -1.3145097E-15 | 2.1336663E-16 |
| A14 | 3.9236447E-19 | -2.0716005E-18 | -4.4375653E-17 |

PROJECTION LENS

CROSS-REFERENCE TO RELATED APPLICATION

This application claims, under 35 USC 119, priority of Japanese Application No. 2003-399708 filed Nov. 28, 2003 and Japanese Application No. 2004-337187 filed Nov. 22, 2004.

BACKGROUND OF THE INVENTION

1. Field of the Invention

The present invention relates to a projection lens, particularly to a projection lens suitable for a rear projection type image display apparatus.

2. Description of the Related Art

"A rear projection type image display apparatus", in which a white light beam emitted from a white light source is separated into color components of three primary colors, a transmission type or a reflection type of image display device is lit with each separated color component light beam, each color component light beam transmitted through or reflected from each color component of the image display device is combined with a color combining system, and a color image is displayed by performing projection on a transmission type screen, has been known as a liquid crystal projection TV and the like.

FIG. 24 is a sectional view schematically showing an example of "the rear projection type image display apparatus". An optical unit b is provided in a cabinet a. A transmission type screen c is provided at a front surface of the cabinet a. The light beam from the optical unit b is projected onto the transmission type screen c through a first folding mirror d, a projection lens e, and a second folding mirror f. Therefore, depth reduction of a TV main body and upsizing of the screen are realized.

FIG. 25 is a schematic block diagram showing an example of an optical system in a well-known three-panel type liquid crystal projection TV. In FIG. 25, the numeral 1 represents a white light source, the numeral 2 represents a UV-IR cut filter, the numeral 3 represents a dichroic filter through which blue light is transmitted, the numeral 4 represents a dichroic filter through which red light is transmitted, the numerals 5, 6, and 7 represent reflection mirrors, the numeral 8 represents a liquid crystal light valve for displaying the blue light, the numeral 9 represents a liquid crystal light valve for displaying green light, the numeral 10 represents a liquid crystal light valve for displaying the red light, the numeral 11 represents a color combining prism, the numeral 12 represents a projection lens, and the numeral 13 represents a screen.

The light beam emitted from the white light source 1 is separated with "a color separation system" including the dichroic filters 3 and 4 and the reflection mirrors 5, 6, and 7, the corresponding liquid crystal light valves 8, 9, and 10 which are the transmission type image display devices are lit with the separated color component light beams respectively, the color component light beams are combined with "the color combining system" including the color combining prism 11 to be incident to the projection lens 12, and a display image of each liquid crystal light valve is magnified and combined to be focused and projected on the screen 13.

Recently, the depth reduction of the projection TV main body and the upsizing of the display screen, i.e., the projection of the image onto a large screen with short projection distance, are demanded for the liquid crystal projection TV, so that a short focal distance and a wide angle of view are required for the projection lens. In order to satisfy such demands, it is necessary to increase a ratio of a back focus to the focal distance of the projection lens. On the other hand, in order to magnify and project the image on the transmission type image display device onto the screen with high contrast, it is necessary to utilize a luminous flux outgoing from the transmission type image display device at an angle substantially perpendicular to the transmission type image display device. Therefore, it is necessary that the projection lens has telecentric characteristics so that a principal ray of an off-axis of the projection lens is perpendicular to the transmission type image display device.

Unlike a CRT (Cathode Ray Tube) method, in the liquid crystal light valve, distortion aberration can not be electrically corrected due to dot matrix display. Accordingly, it is necessary that the small distortion aberration is realized by the projection lens itself. However, the realization of the small distortion aberration in the projection lens becomes hinders in realizing the wide angle of view and the long back focus of the projection lens.

In consideration of the above-described problems, there has been proposed a conventional technology described in Japanese Patent Application Laid-Open (JP-A) No. 2003-156683. In a first embodiment of JP-A No. 2003-156683, the aberrations are corrected by using two aspherical lenses made of acryl resin in a nine-lens configuration.

However, in the case of the above-described acryl resin lens, there is a problem that positional shift of the back focus (change in focusing surface) due to temperature change is large. For example, assuming that the amount of change in refractive index of the acryl resin by the temperature change is set to $-1.088 \times 10^{-4}/°$ C., the change in focusing surface is generated as large as $+31.6$ $\mu$m when the temperature is increased by 20° C.

Further, as pixels of the transmission type image display device becomes high density (finer), improvement in optical performance of the projection lens becomes important, particularly, a decrease in "chromatic aberration of magnification" becomes important. However, in the conventional projection lens, the chromatic aberration of magnification has $+19$ $\mu$m at the blue light (450 nm) and the chromatic aberration of magnification has $+22$ $\mu$m at the red light (620 nm). Since these values are larger than a pixel size of a 15 $\mu$m by 15 $\mu$m square of the current image display device, there is a problem that color shift is generated toward a periphery in the projected image.

SUMMARY OF THE INVENTION

In view of the foregoing, an object of the invention is to provide a projection lens which suppresses the influence due to the temperature change and the color shift.

The projection lens of the present invention which projects an image of a rectangular image display device on a surface of a screen, the projection lens is characterized in that a first group having a negative refractive power and a second group having a positive refractive power are arranged in order from a magnified side toward a reduced side, the first group is configured to arrange a first lens and a second lens in order from the magnified side, and the second group is configured to arrange a third lens to a seventh lens in order from the magnified side, the first lens is a negative meniscus lens whose both surfaces are formed by aspherical surface in which an area near an optical axis of the surface on the magnified side is a concave surface, the second lens is the negative meniscus lens whose both surfaces are formed by the aspherical surface in which the area near the optical axis of the surface on the magnified side is the concave surface, the third lens is a cemented lens in which a bi-concave lens is cemented to the surface on the reduced side of a bi-convex lens, the fourth lens is a positive meniscus lens whose both surfaces are formed by the aspherical surface, and a convex surface of the positive meniscus lens faces toward the reduced side, the fifth lens is the cemented lens in which the bi-concave lens is cemented to the surface on the reduced side of the bi-convex lens, the sixth lens is a positive lens whose both surfaces are a convex surface, the seventh lens is the positive lens whose strong convex surface faces toward the reduced side, and an stop is arranged between the first group and the second group.

A wide angle of view, high focusing performance, and a finer image can be realized by forming the projection lens in the above-described way.

It is desirable that the first lens, the second lens, and the fourth lens are molded with a synthetic resin respectively, and Abbe numbers of these lenses ν1, ν2, and ν4 satisfy ν1, ν2, and ν4>54, and the Abbe numbers of the sixth and seventh lenses ν6 and ν7 satisfy ν6 and ν7>68. Therefore, when the condition of the Abb numbers is satisfied, an increase in refractive index by decrease in wavelength can be reduced.

It is desirable that the negative refractive power of the first and second lenses and the positive refractive power of the fourth lens have values which suppress positional shift of back focus due to temperature change by canceling out each other. Therefore, when the temperature is changed, the positional shift of the back focus by the first and second lenses and the positional shift of the back focus by the fourth lens are generated in the opposite directions to each other while the values of the positional shifts are substantially similar to each other, so that the positional shifts are suppressed by canceling out each other.

The projection lens of the invention has its feature in that magnification is changed by changing the surface of the second lens or changing an interval between the first group and the second group.

According to the above-described configuration, when the magnification is increased, the surface shape of the second lens is changed to increase the negative refractive power, and the interval between the first group and the second group is narrowed. At this point, either the surface shape of the second lens or the interval between the first group and the second group, or both the surface shape of the second lens and the interval between the first group and the second group are appropriately changed depending on the degree to which the magnification is increased. When the magnification is decreased, contrary to the case of the increase in magnification, the surface shape of the second lens is changed to weaken the negative refractive power, and the interval between the first group and the second group is widened. In this case, similarly to the case of the increase in magnification, either the surface shape of the second lens or the interval between the first group and the second group, or both the surface shape of the second lens and the interval between the first group and the second group are appropriately changed depending on the degree to which the magnification is decreased.

It is desirable that a condition of $9<f_4/|f_I|<17$ is satisfied when a focal distance of the first group is set to $f_I$ and the focal distance of the fourth lens of the second group is set to $f_4$. Therefore, the positional shift of the back focus is suppressed to a practical use level by setting the focal distances of the first group and the focal distance of the fourth lens of the second group so that the above-described condition is satisfied.

It is desirable that conditions of $2.5<B_{FL}/f$ and $1.1<f_{II}/|f_I|<1.7$ are satisfied when the focal distance of the whole system is set to f, the back focus of the whole system is set to $B_{FL}$, the focal distance of the first group is set to $f_I$, and the focal distance of the second group is set to $f_{II}$. High focusing performance and a finer image can be realized by performing the setting so that the conditions are satisfied.

It is desirable that optical path folding means is provided between the first group and the stop. Therefore, the depth of the projection TV and the like can be decreased by folding the optical path with the optical path folding means.

As described above, according to the present invention, the following effects can be achieved.

(1) In spite of using many aspherical lenses made of a synthetic resin for the first group and the second group, a finer image can be projected while suppressing, to a practical use level, the positional shift of the back focus due to the temperature change.

(2) The projection lens of the invention has a wide angle of view and a long back focus, and good telecentric characteristics and good correction of the distortion aberration can be realized.

(3) Good correction of the distortion aberration, weight reduction, and high focusing performance by the good correction of the chromatic aberration of magnification can be realized at low cost.

(4) Positional shift of the back focus (change in focusing surface) due to the temperature change can be suppressed.

(5) Magnification can be changed by minimum change in lens element such that the surface of the second lens is changed or the interval between the first group and the second group is changed.

BRIEF DESCRIPTION OF THE DRAWINGS

FIG. 3 is a table showing numerical values of various parts in the projection lens of Example 1;

FIG. 4 is an aberration view showing spherical aberration, astigmatism, distortion aberration, and chromatic aberration of magnification of the projection lens of Example 1;

FIG. 5 is a table showing numerical values of various parts in the projection lens of Example 2;

FIG. 6 is an aberration view showing spherical aberration, astigmatism, distortion aberration, and chromatic aberration of magnification of the projection lens of Example 2;

FIG. 8 is a table showing numerical values of various parts in the projection lens of Example 3;

FIG. 10 is a table showing numerical values of various parts in the projection lens of Example 4;

FIG. 13 is a table showing numerical values of various parts in the projection lens of Example 5;

FIG. 15 is a schematic side view showing a lens configuration and a ray tracing of Example 6;

FIG. 16 is a table showing numerical values of various parts in the projection lens of Example 6;

FIG. 17 is an aberration view showing spherical aberration, astigmatism, distortion aberration, and chromatic aberration of magnification of the projection lens of Example 6;

FIG. 19 is a table showing numerical values of various parts in the projection lens of Example 7;

FIG. 22 is a table showing numerical values of various parts in the projection lens of Example 8;

DETAILED DESCRIPTION OF THE PREFERRED EMBODIMENTS

[First Embodiment]

Referring to the accompanying drawings, a projection lens according to a first embodiment of the invention will be described below.

Figure 1:
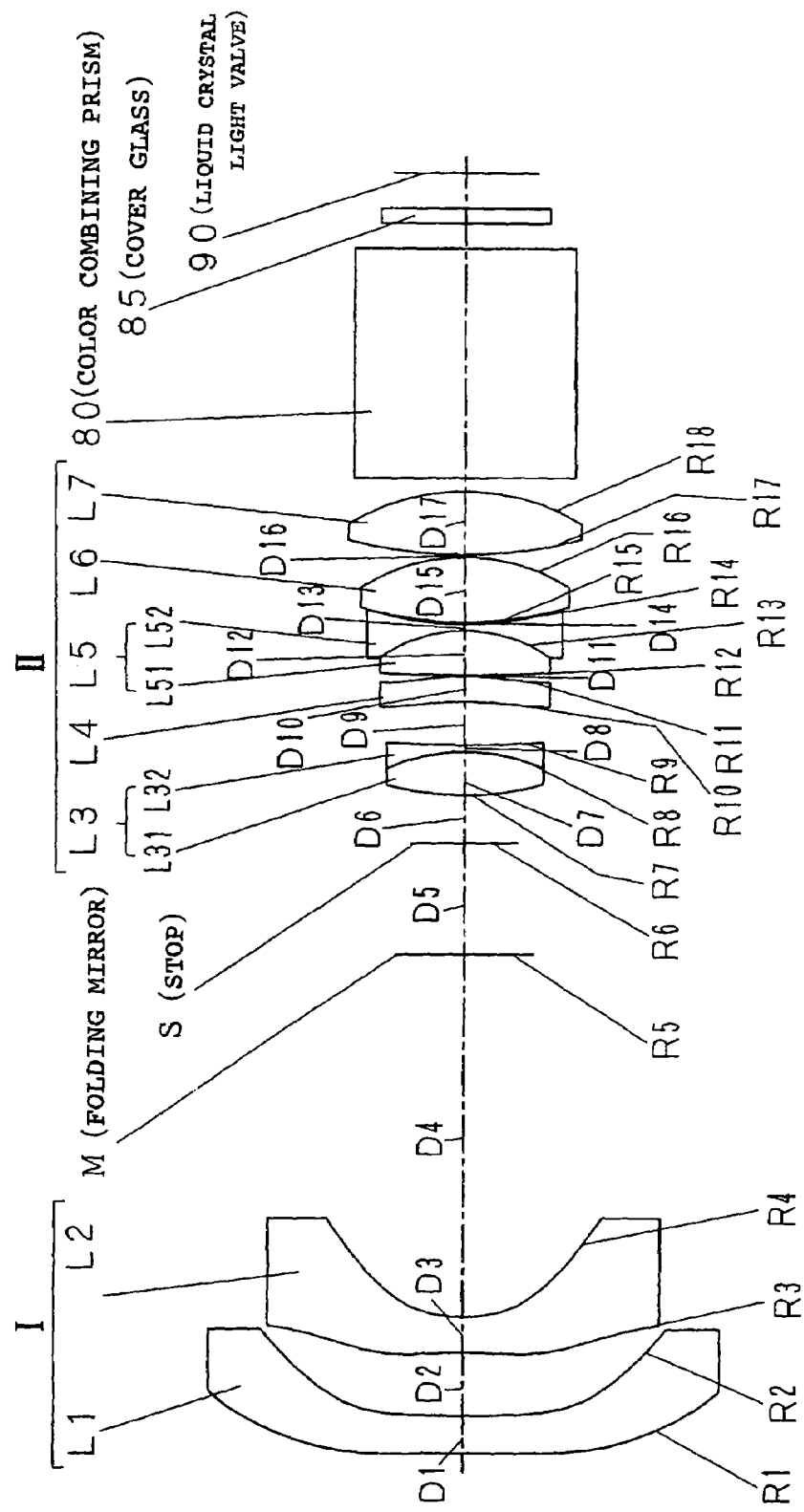
FIG. 1 is a schematic side view showing a configuration of a projection lens according to a first embodiment of the present invention.

As shown in FIG. 1, the projection lens according to the first embodiment is one which magnifies and projects a color image of a liquid crystal light valve 90 which is of a transmission type image display device on a screen (not shown) provided on the left side of FIG. 1. Hereinafter the side of the screen is referred to as "magnified side" and the side of the transmission type image display device such as the liquid crystal light valve 90 is referred to as "reduced side".

In FIG. 1, the projection lens is configured to arrange a first group I having a negative refractive power and a second group II having a positive refractive power in order from the magnified side toward the reduced side. A color combining prism 80, a cover glass 85, and the liquid crystal light valve 90 are provided on the reduced side of the second group II.

The projection lens formed by arranging the first group I and the second group II is referred to as "retro-focus type". A back focus can be lengthened in the retro-focus type projection lens, and the retro-focus type projection lens is also suitable for a wide angle lens. The first group I includes a first lens L1 and a second lens L2 in order from the magnified side. The second group II includes a third lens L3, a fourth lens L4, a fifth lens L5, a sixth lens L6, and a seventh lens L7 in order from the magnified side.

Both the first lens L1 and the second lens L2 are a negative meniscus lens whose both surfaces are formed by aspherical surface in which an area near an optical axis of the surface on the magnified side is a concave surface. The third lens L3 is a cemented lens in which a bi-concave lens L32 is cemented to the surface on the reduced side of a bi-convex lens L31. The fourth lens L4 is a positive meniscus lens whose both surfaces are formed by the aspherical surface, and a convex surface of the positive meniscus lens faces toward the reduced side. The fifth lens L5 is the cemented lens in which the bi-concave lens L52 is cemented to the surface on the reduced side of the bi-convex lens L51. The sixth lens L6 is a positive lens whose strong convex surface faces toward the reduced side. The seventh lens L7 is the positive lens whose both surface are a convex surface.

A stop S is provided between the first group I and the second group II. An optical path folding mirror M is provided between the first group I and the stop S.

The distortion aberration is favorably corrected by forming all the surfaces of the first group I in the aspherical shape (Four surfaces are formed in the aspherical shape.) Further, the astigmatism of the off-axis aberration, coma aberration, and the like can favorably be corrected to realize a bright projection lens by combining the two lenses L1 and L2 of the first group I and the fourth lens L4 of the second group II. The fourth lens L4 is the meniscus lens whose both surfaces are formed by the aspherical surface, and the fourth lens L4 is arranged immediately after (reduced side) the third lens L3 which is of the cemented lens of the second group II in which axial luminous flux is maximally widened. The fourth lens L4 has the weak positive refractive power.

The two lenses L1 and L2 of the first group I, the fourth lens L4 of the second group II, and the sixth lens L6 and the seventh lens L7 of the second group II are set so that the following conditions are satisfied:

(1) $\nu 1$, $\nu 2$, and $\nu 4 > 54$ (2) $\nu 6$ and $\nu 7 > 68$, where $\nu$ is Abbe number of a lens medium.

As is well known in the art, the Abbe number $\nu$ is defined by $\nu = (Nd-1)/(NF-NC)$ when the refractive indexes of F line, d line, and C line of the lens medium are set to NF, Nd, and NC respectively.

In the ray emitted from the first group I toward the screen, when "change by wavelength" of an angle formed by the principal ray and the optical axis is large, a large chromatic aberration of magnification is generated on the screen. On the contrary, in the two lenses on the reduced sides of the first group I and the second group II, the distance between the optical axis and the principal ray of the off-axis luminous flux is increased, which largely affects on the chromatic aberration of magnification.

As the wavelength is shortened, the refractive index of the lens medium is increased. However, in the medium satisfying the conditions (1) and (2), "increase in refractive index when the wavelength is shortened" is small. When the material having characteristics satisfying the conditions (1) and (2) is used for "the lens having high principal ray height and high power" in the first group I and the second group II, the position of an exit point of the principal ray height emitted from the first group I or "difference depending on the wavelength" of the angle formed by the optical axis can be decreased and the strict requirement for the chromatic aberration of magnification can be satisfied.

In the first lens L1 of the first group I, the distance between the optical axis and the principal ray of the off-axis luminous flux is large, so that a lens diameter tends to become large. The first lens L1 and the second lens L2 are made of the synthetic resin satisfying the condition (1). Therefore, while the influence on the chromatic aberration is suppressed, the weight of the first lens L1 and the second lens L2 can be reduced, and production cost can also be reduced.

Since the first group I has the negative refractive power, when the synthetic resin lenses are used only for the first group I, the positional shift of the back focus (change in focusing surface) is generated by the temperature change in refractive index. In order to cancel over the positional shift of the back focus, it is necessary that the second group II is formed so as to include the synthetic resin lens element having the relatively weak positive refractive power.

In the first embodiment, the second group II is formed by including the fourth lens L4. Assuming that the focal distance of the first group I is set to $f_I$ and the focal distance of the fourth lens L4 in the second group II is set to $f_4$, the projection lens of the embodiment is formed so as to satisfy the following condition.

(3) $9 < f_4/|f_I| < 17$

Assuming that the focal distance of the whole system is set to f, the back focus of the whole system is set to $B_{FL}$, the focal distance of the first group I is set to $f_I$, and the focal distance of the second group II is set to $f_{II}$, the projection lens of the embodiment is formed so as to satisfy the following conditions.

(4) $2.5 < B_{FL} < f$ (5) $1.1 < f_{II}/|f_I| < 1.7$

According to the projection lens of the first embodiment, in the retro-focus type lens in which the first group I has the negative refractive power and the second group II has the positive refractive power, a space where the color combining prism can be installed is secured by the back focus $B_{FL}$ not lower than 2.5 times of the focal distance f, and a long air interval between the first group I and the second group II is formed. Therefore, in order that the optical path can be folded, the projection lens has strong telecentric characteristics, and good optical characteristics are realized, it is desirable to satisfy the conditions (4) and (5).

When compared with the case of the projection TV apparatus including the projection lens in which the optical path is not changed, the depth of the cabinet can be reduced in the projection TV apparatus.

EXAMPLE 1

For the projection lens of the first embodiment, Example 1 will be described below using specific numerical values.

As shown in FIG. 1, it is assumed that a curvature radius of an ith surface from the magnified side is set to Ri and a surface interval on an optical axis between the ith surface and a (i+1)-th surface is set to Di. The values of the d line are used for the refractive index and the Abbe number. The focal distance of the whole system is represented by f (value of the e line), the brightness is represented by F/no, the angle of view is represented by 2ω, the lateral magnification is represented by M, and the projection distance is represented by L.

As is well known, in the aspheric surface, when R is set to a paraxial curvature radius, K is set to a conical constant, A3, A4, . . . , and A14 are set to tertiary, quartic, . . . , and four-teenth-order aspheric constants respectively in a Cartesian coordinate (X, Y, Z) in which the optical axis is set to the Z axis, it is assumed that the surface shape in the coordinate $h = (X^2+Y^2)^{1/2}$ is expressed by the following equation.

$$Z(h) = (h^2/R)/\left[1 + \{1 - (1+K) \cdot (h/R)^2\}^{1/2}\right] +$$
$$A3 \cdot h^3 + A4 \cdot h^4 + A5 \cdot h^5 + A6 \cdot h^6 +$$
$$A7 \cdot h^7 + A8 \cdot h^8 + A9 \cdot h^9 + A10 \cdot h^{10} +$$
$$A11 \cdot h^{11} + A12 \cdot h^{12} + A13 \cdot h^{13} + A14 \cdot h^{14}$$

Since the dichroic filter in the color combining prism 80 is an interference thin film formed by vacuum evaporation, spectral characteristics are changed depending on an incident angle (spectral characteristics are shifted to the shorter wavelength side as the incident angle is increased). Therefore, in order to prevent irregular color, i.e., a so-called color shading from generating on the screen, the projection lens of the first embodiment has telecentric characteristics in which the principal ray of an off-axis ray becomes parallel to the optical axis, and the projection lens also securely takes in the ray perpendicularly emitted from the peripheral image of the liquid crystal light valve 90 to realize high contrast. The principal ray angle ranges within 0.5° in all the angles of view.

The focusing is performed by moving the whole second group II located on the reduced side from a stop S in the optical axis direction.

Figure 2:
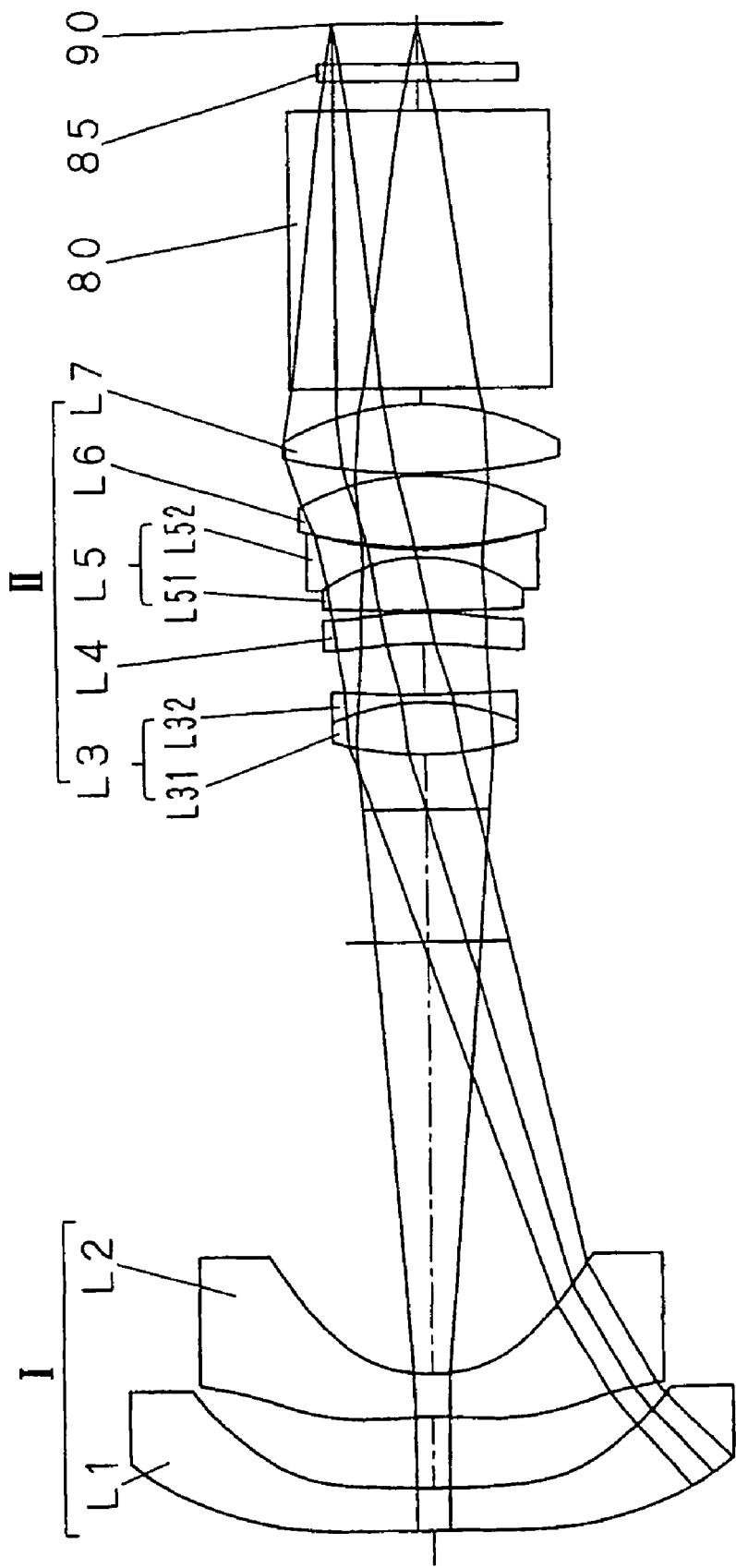
FIG. 2 is a schematic side view showing a lens configuration and a ray tracing of Example 1 and Example 2.

FIG. 2 shows a lens configuration and a ray tracing in Example 1.

In Example 1, the focal distance f is set to 10.86 mm, the brightness F/no is set to 2.41, the back focus $B_{FL}$ is set to 37.577 mm, the angle of view 2ω is set to 90.1°, the lateral magnification M is set to −1/53.21×, and the projection distance L is set to 542.0 mm.

FIG. 3 shows the result of the lens design by the above-described setting, and FIG. 4 shows the result of simulations of various kinds of the aberration in the lens design of FIG. 3. As can be seen from a graph in FIG. 4, good results are obtained in the spherical aberration, the astigmatism, the distortion aberration, and the chromatic aberration of magnification.

EXAMPLE 2

For the projection lens of the first embodiment, Example 2 will be described below using specific numerical values.

The definitions of the curvature radius Ri, the surface interval Di on the optical axis, and the like are set in the same way as Example 1.

In Example 2, the lens configuration and the ray tracing are substantially similar to Example 1 of FIG. 2.

In Example 2, the focal distance f is set to 10.76 mm, the brightness F/no is set to 2.41, the back focus $B_{FL}$ is set to 37.581 mm, the angle of view 2ω is set to 91.1°, the lateral magnification M is set to −1/74.74×, and the projection distance L is set to 768.0 mm.

FIG. 5 shows the result of the lens design by the above-described setting, and FIG. 6 shows the result of the simulations of various kinds of the aberration in the lens design of FIG. 5. As can be seen from a graph in FIG. 6, the good results are obtained in the spherical aberration, the astigmatism, the distortion aberration, and the chromatic aberration of magnification.

EXAMPLE 3

For the projection lens of the first embodiment, Example 3 will be described below using specific numerical values.

The definitions of the curvature radius Ri, the surface interval Di on the optical axis, and the like are set in the same way as Example 1.

Figure 7:
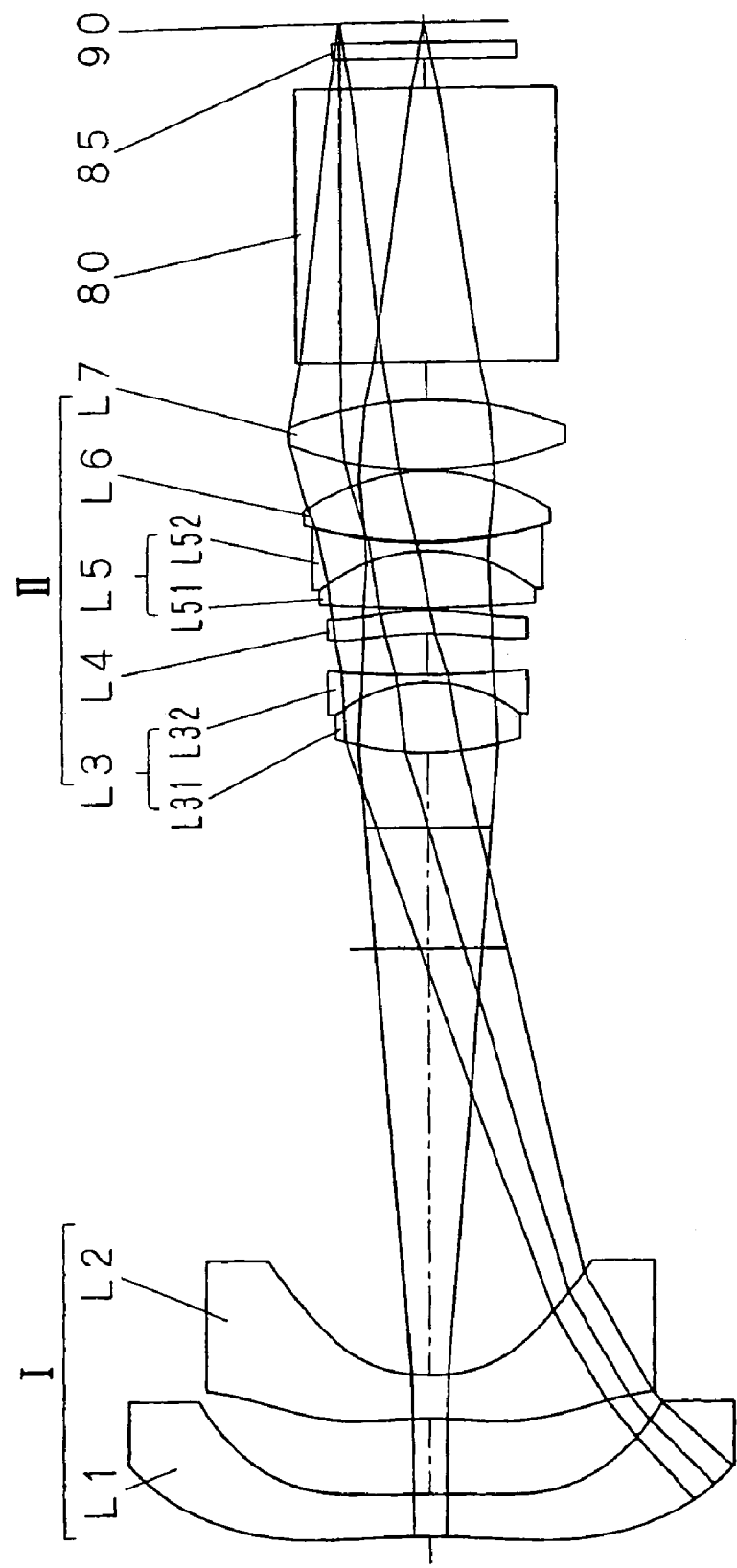
FIG. 7 is a schematic side view showing a lens configuration and a ray tracing of Example 3 and Example 4.

FIG. 7 shows the lens configuration and the ray tracing in Example 3.

In Example 3, the focal distance f is set to 10.83 mm, the brightness F/no is set to 2.40, the back focus $B_{FL}$ is set to 37.577 mm, the angle of view 2ω is set to 90.1°, the lateral magnification M is set to -1/53.30×, and the projection distance L is set to 542.0 mm.

Figure 9:
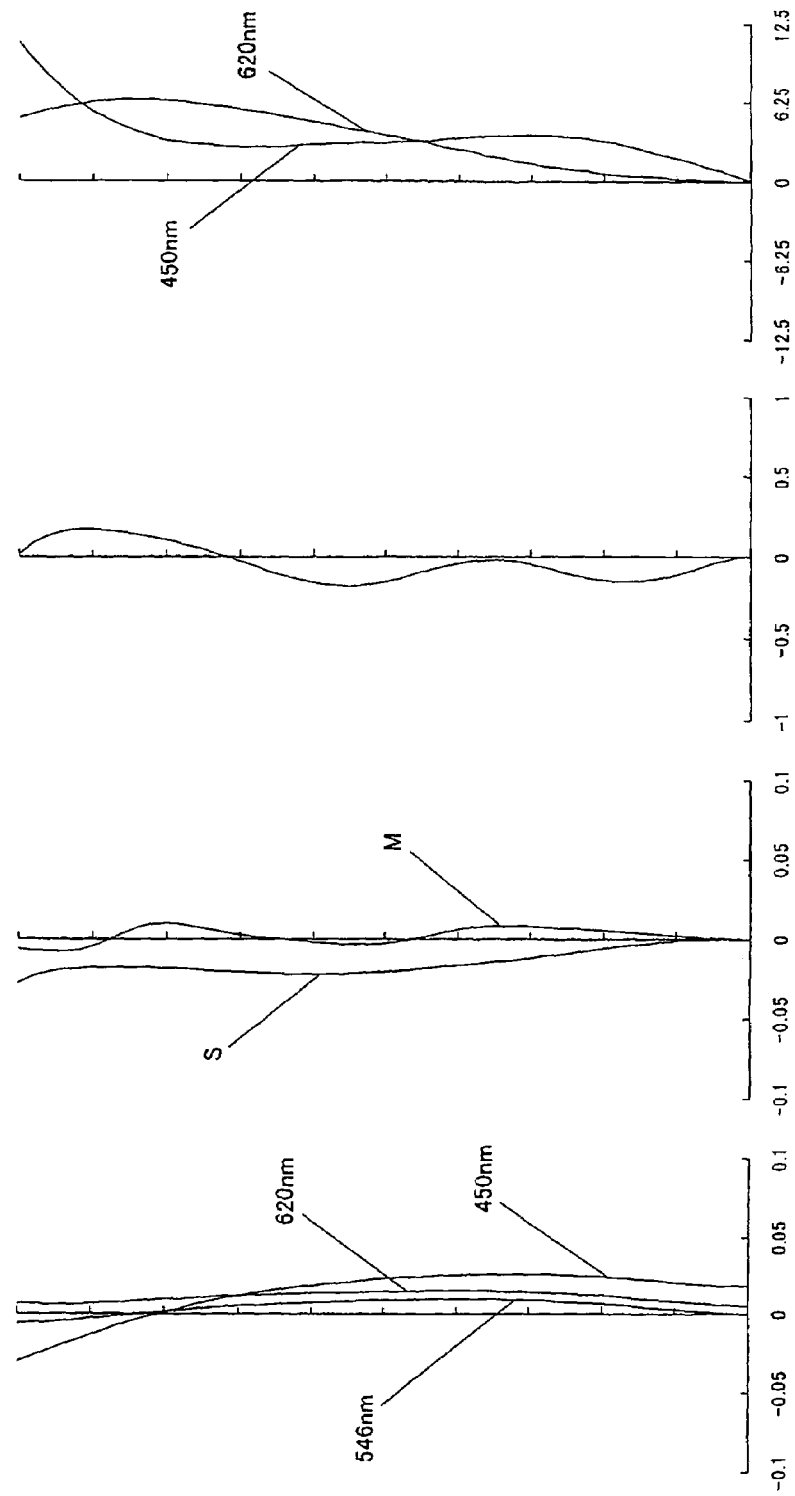
FIG. 9 is an aberration view showing spherical aberration, astigmatism, distortion aberration, and chromatic aberration of magnification of the projection lens of Example 3.

FIG. 8 shows the result of the lens design by the above-described setting, and FIG. 9 shows the result of the simulations of various kinds of the aberration in the lens design of FIG. 8. As can be seen from a graph in FIG. 9, the good results are obtained in the spherical aberration, the astigmatism, the distortion aberration, and the chromatic aberration of magnification.

EXAMPLE 4

For the projection lens of the first embodiment, Example 4 will be described below using specific numerical values.

The definitions of the curvature radius Ri, the surface interval Di on the optical axis, and the like are set in the same way as Example 1.

In Example 4, the lens configuration and the ray tracing are substantially similar to Example 3 of FIG. 7.

In Example 4, the focal distance f is set to 10.72 mm, the brightness F/no is set to 2.41, the back focus $B_{FL}$ is set to 37.582 mm, the angle of view 2ω is set to 91.1°, the lateral magnification M is set to -1/74.91×, and the projection distance L is set to 768.0 mm.

Figure 11:
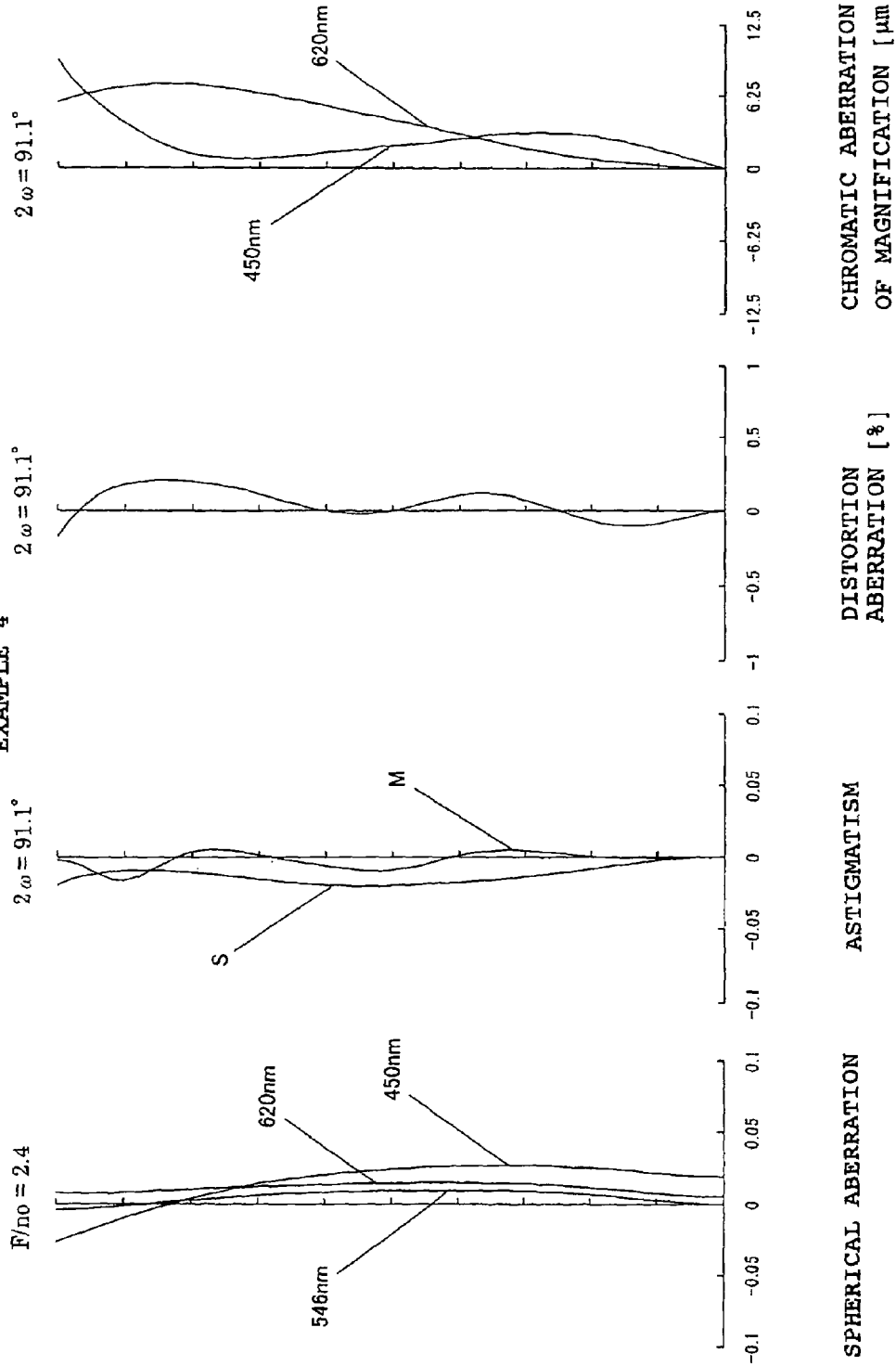
FIG. 11 is an aberration view showing spherical aberration, astigmatism, distortion aberration, and chromatic aberration of magnification of the projection lens of Example 4.

FIG. 10 shows the result of the lens design by the above-described setting, and FIG. 11 shows the result of the simulations of various kinds of the aberration in the lens design of FIG. 10. As can be seen from a graph in FIG. 11, the good results are obtained in the spherical aberration, the astigmatism, the distortion aberration, and the chromatic aberration of magnification.

EXAMPLE 5

For the projection lens of the first embodiment, Example 5 will be described below using specific numerical values.

The definitions of the curvature radius Ri, the surface interval Di on the optical axis, and the like are set in the same way as Example 1.

Figure 12:
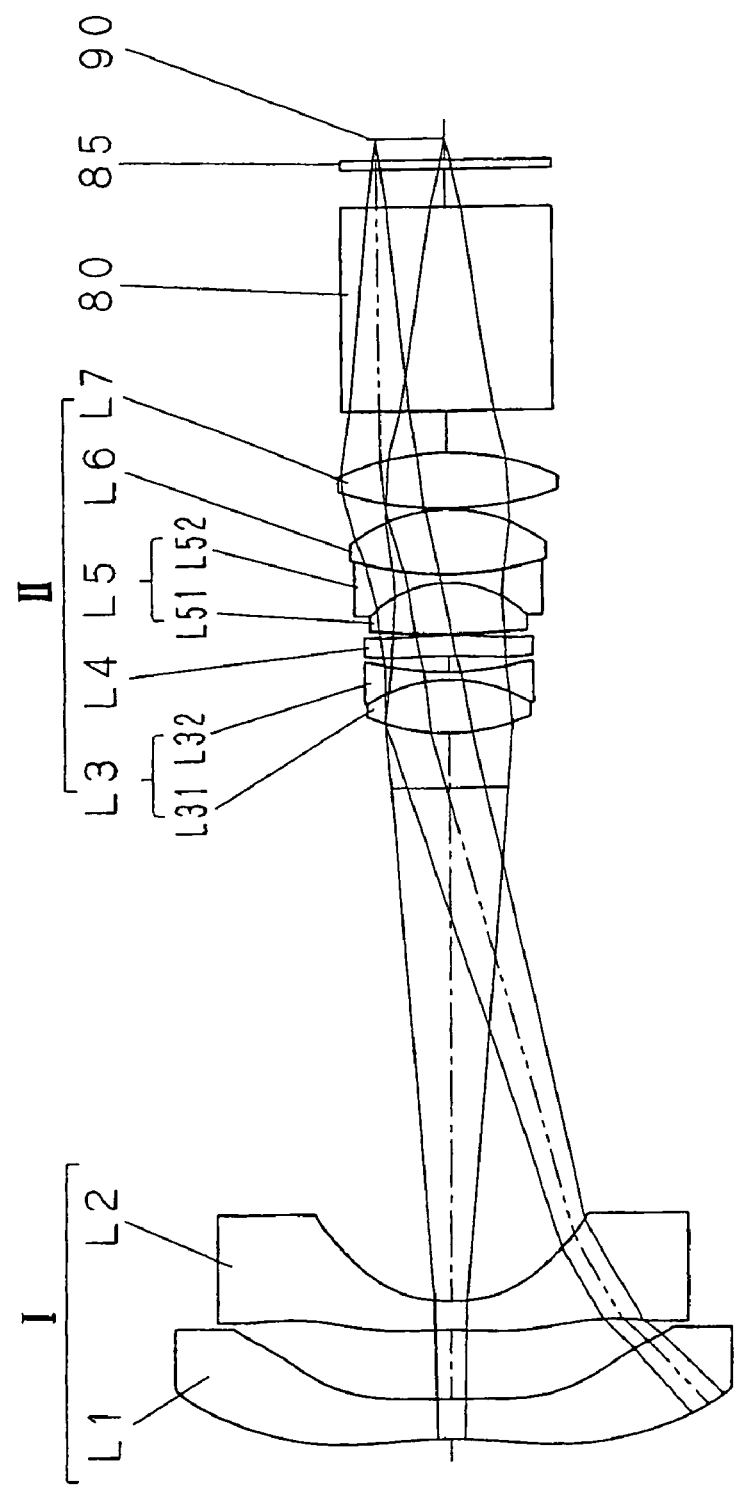
FIG. 12 is a schematic side view showing a lens configuration and a ray tracing of Example 5.

FIG. 12 shows the lens configuration and the ray tracing in Example 5. The folding mirror M is omitted in FIG. 12. However, the folding mirror M is located at intermediate points between the first group I and the second group II.

In Example 5, the focal distance f is set to 8.50 mm, the brightness F/no is set to 2.3, the back focus $B_{FL}$ is set to 32.270 mm, the angle of view 2ω is set to 92.5°, the lateral magnification M is set to -1/81.7×, and the projection distance L is set to 660.42 mm.

Figure 14:
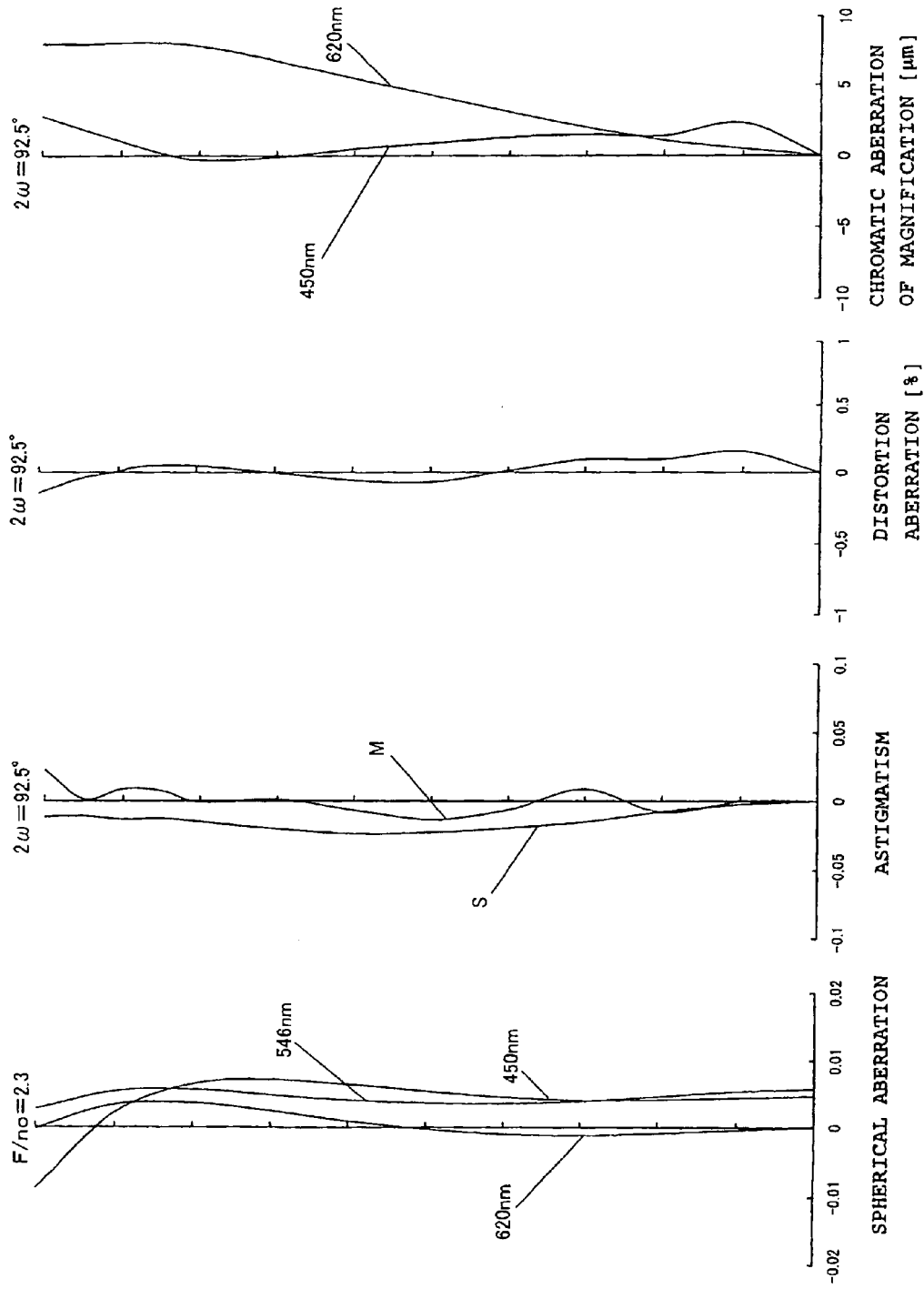
FIG. 14 is an aberration view showing spherical aberration, astigmatism, distortion aberration, and chromatic aberration of magnification of the projection lens of Example 5.

FIG. 13 shows the result of the lens design by the above-described setting, and FIG. 14 shows the result of the simulations of various kinds of the aberration in the lens design of FIG. 13. As can be seen from a graph in FIG. 14, the good results are obtained in the spherical aberration, the astigmatism, the distortion aberration, and the chromatic aberration of magnification.

[B. Second Embodiment]

Then, a projection lens according to a second embodiment of the invention will be described referring to the accompanying drawings.

The projection lens of the first embodiment is one which projects the color image light beams from the liquid crystal light valve (see the numeral 90 in FIG. 1). On the other hand, the projection lens of the second embodiment is one which projects the color image light beams from a DMD (Digital Micromirror Device; registered trademark) element. However, the liquid crystal light valve of the first embodiment is replaced with the DMD element, the projection lens of the second embodiment is similar to the projection lens of the first embodiment in the technical idea of the configuration.

EXAMPLE 6

For the projection lens of the second embodiment, Example 6 will be described below using specific numerical values.

The definitions of the curvature radius Ri, the surface interval Di on the optical axis, and the like are set in the same way as Example 1.

FIG. 15 shows the lens configuration and the ray tracing in Example 6. In FIG. 15, a cover glass 85A, an illuminating optical system TIR (total reflection) prism 80A, and a DMD element 90A are provided on the reduced side of the second group II in the projection lens. The folding mirror M is omitted in FIG. 15. However, the folding mirror M is located at intermediate points between the first group I and the second group II.

In Example 6, the focal distance f is set to 6.97 mm, the brightness F/no is set to 2.4, the back focus $B_{FL}$ is set to 31.046 mm, the angle of view 2ω is set to 93.5°, the lateral magnification M is set to -1/97.5×, and the projection distance L is set to 649.0 mm.

FIG. 16 shows the result of the lens design by the above-described setting, and FIG. 17 shows the result of the simulations of various kinds of the aberration in the lens design of FIG. 16. As can be seen from a graph in FIG. 17, good results are obtained in the spherical aberration, the astigmatism, the distortion aberration, and the chromatic aberration of magnification.

EXAMPLE 7

For the projection lens of the second embodiment, Example 7 will be described below using specific numerical values.

The definitions of the curvature radius Ri, the surface interval Di on the optical axis, and the like are set in the same way as Example 1.

Figure 18:
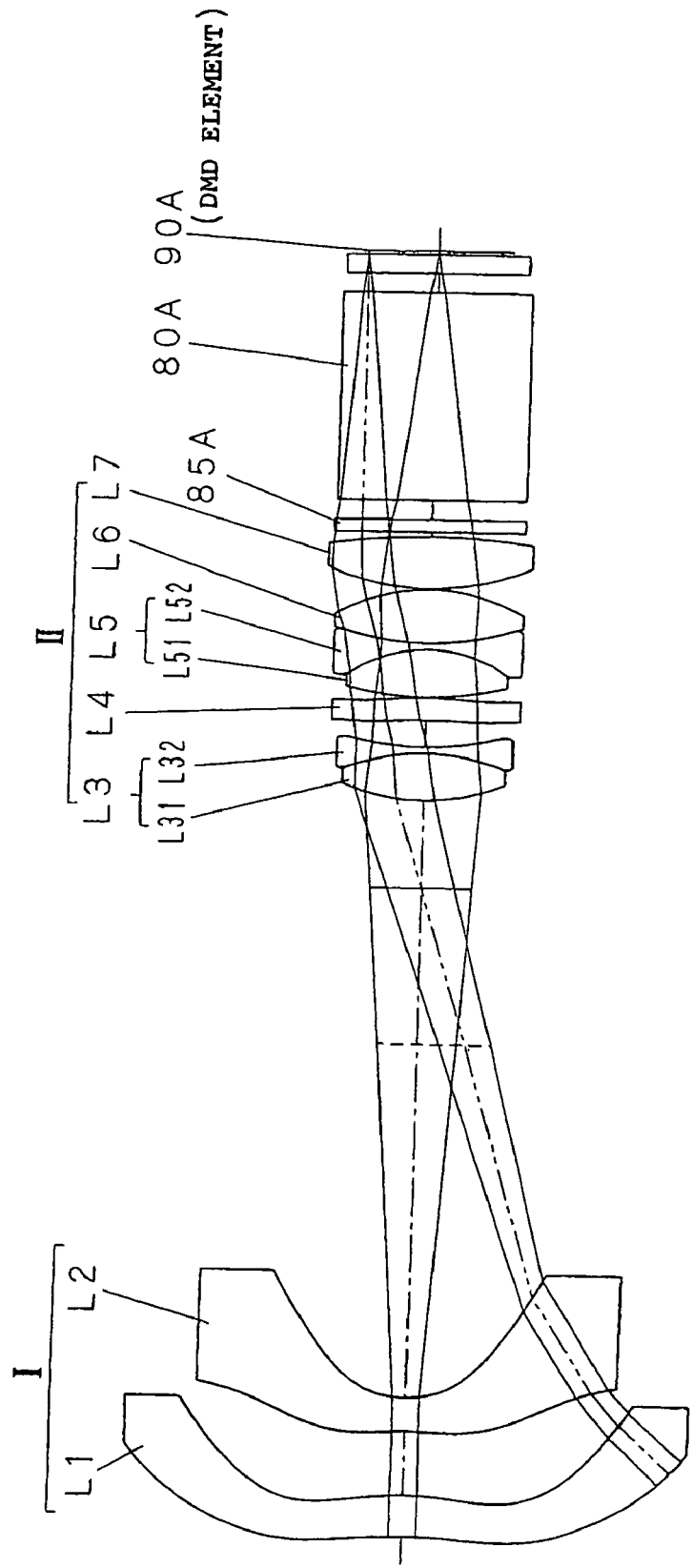
FIG. 18 is a schematic side view showing a lens configuration and a ray tracing of Example 7.

FIG. 18 shows the lens configuration and the ray tracing in Example 7. In FIG. 18, the cover glass 85A, the illuminating optical system TIR (total reflection) prism 80A, and the DMD element 90A are also provided on the reduced side of the second group II in the projection lens. The folding mirror M is omitted in FIG. 18. However, the folding mirror M is located at intermediate points between the first group I and the second group II.

In Example 7, the focal distance f is set to 10.39 mm, the brightness F/no is set to 2.4, the back focus $B_{FL}$ is set to 31.046 mm, the angle of view 2ω is set to 90.8°, the lateral magnification M is set to -1/64.69×, and the projection distance L is set to 634.0 mm.

Figure 20:
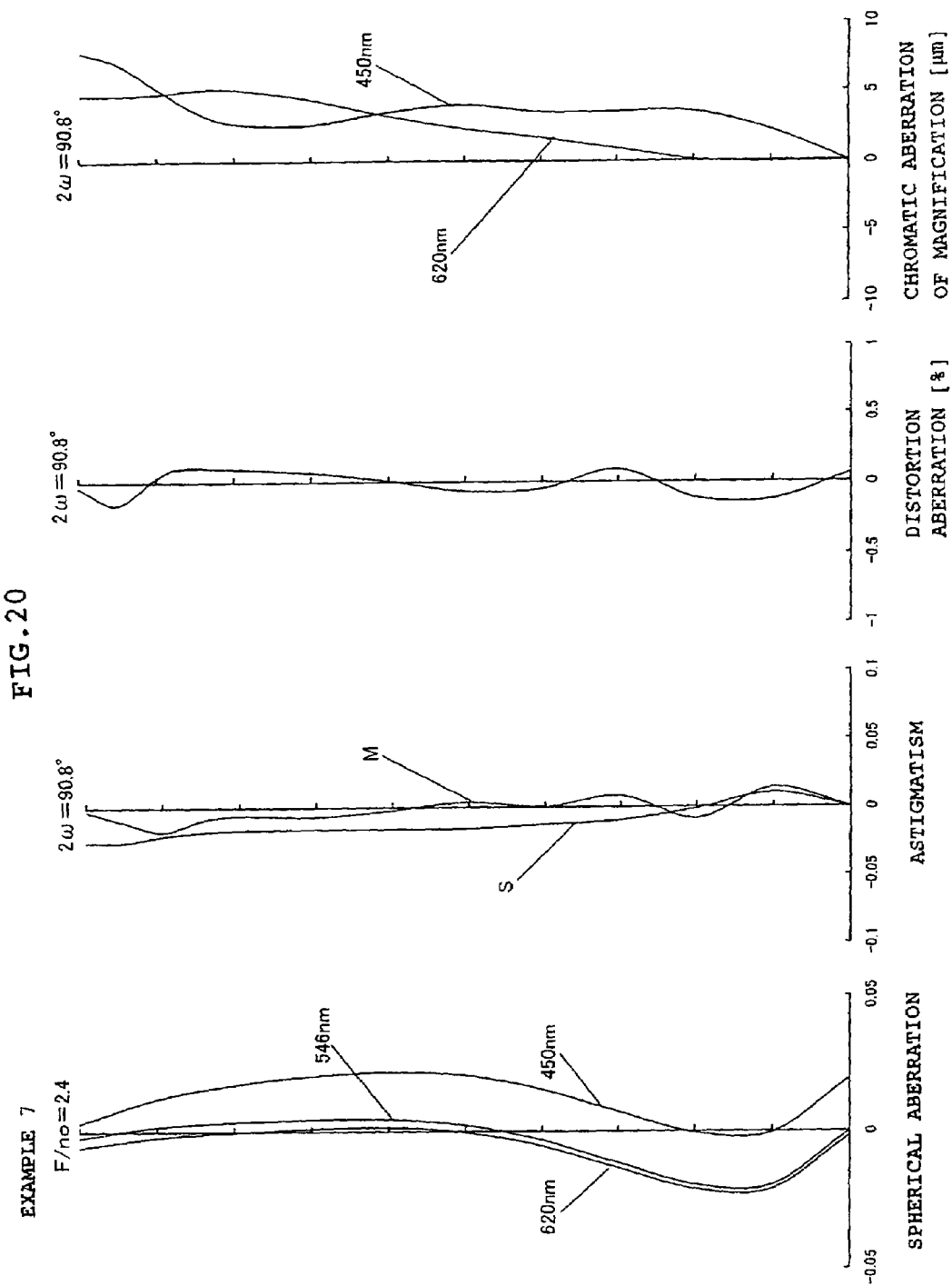
FIG. 20 is an aberration view showing spherical aberration, astigmatism, distortion aberration, and chromatic aberration of magnification of the projection lens of Example 7.

FIG. 19 shows the result of the lens design by the above-described setting, and FIG. 20 shows the result of the simulations of various kinds of the aberration in the lens design of FIG. 16. As can be seen from a graph in FIG. 20, the good results are obtained in the spherical aberration, the astigmatism, the distortion aberration, and the chromatic aberration of magnification.

[C. Third Embodiment]

Then, a projection lens according to a third embodiment of the invention will be described referring to the accompanying drawings.

The projection lens of the first embodiment is one which projects the color image light beams from the transmission type liquid crystal light valve (see the numeral 90 in FIG. 1), and the projection lens of the second embodiment is one which projects the color image light beams from the DMD element. On the other hand, the projection lens of the third embodiment is one which projects the color image light beam from the reflection type liquid crystal light valve. Although in the image display device, the transmission type liquid crystal light valve of the first embodiment or the DMD element of the second embodiment is replaced with the reflection type liquid crystal light valve, the projection lens of the third embodiment is also similar to the projection lenses of the first and second embodiments in the technical idea of the configuration.

EXAMPLE 8

For the projection lens of the third embodiment, Example 8 will be described below using specific numerical values.

The definitions of the curvature radius Ri, the surface interval Di on the optical axis, and the like are set in the same way as Example 1.

Figure 21:
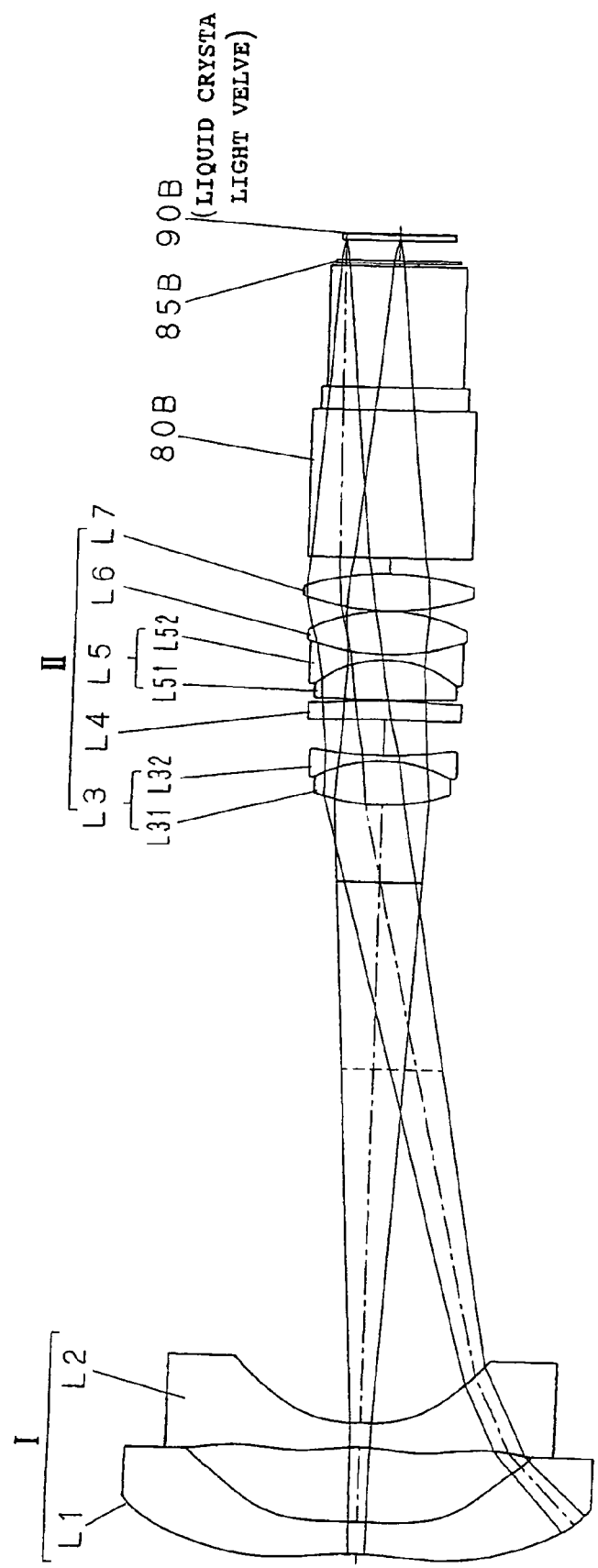
FIG. 21 is a schematic side view showing a lens configuration and a ray tracing of Example 8.

FIG. 21 shows the lens configuration and the ray tracing in Example 8. In FIG. 21, a color separating/color combining prism 80B which uses polarization beam splitter, a cover glass 85B and a reflection type liquid crystal light valve 90B are provided on the reduced side of the second group II in the projection lens.

In Example 8, the focal distance f is set to 9.23 mm, the brightness F/no is set to 2.9, the back focus $B_{FL}$ is set to 39.270 mm, the angle of view 2ω is set to 93.6°, the lateral magnification M is set to −1/92.4×, and the projection distance L is set to 769.9 mm.

Figure 23:
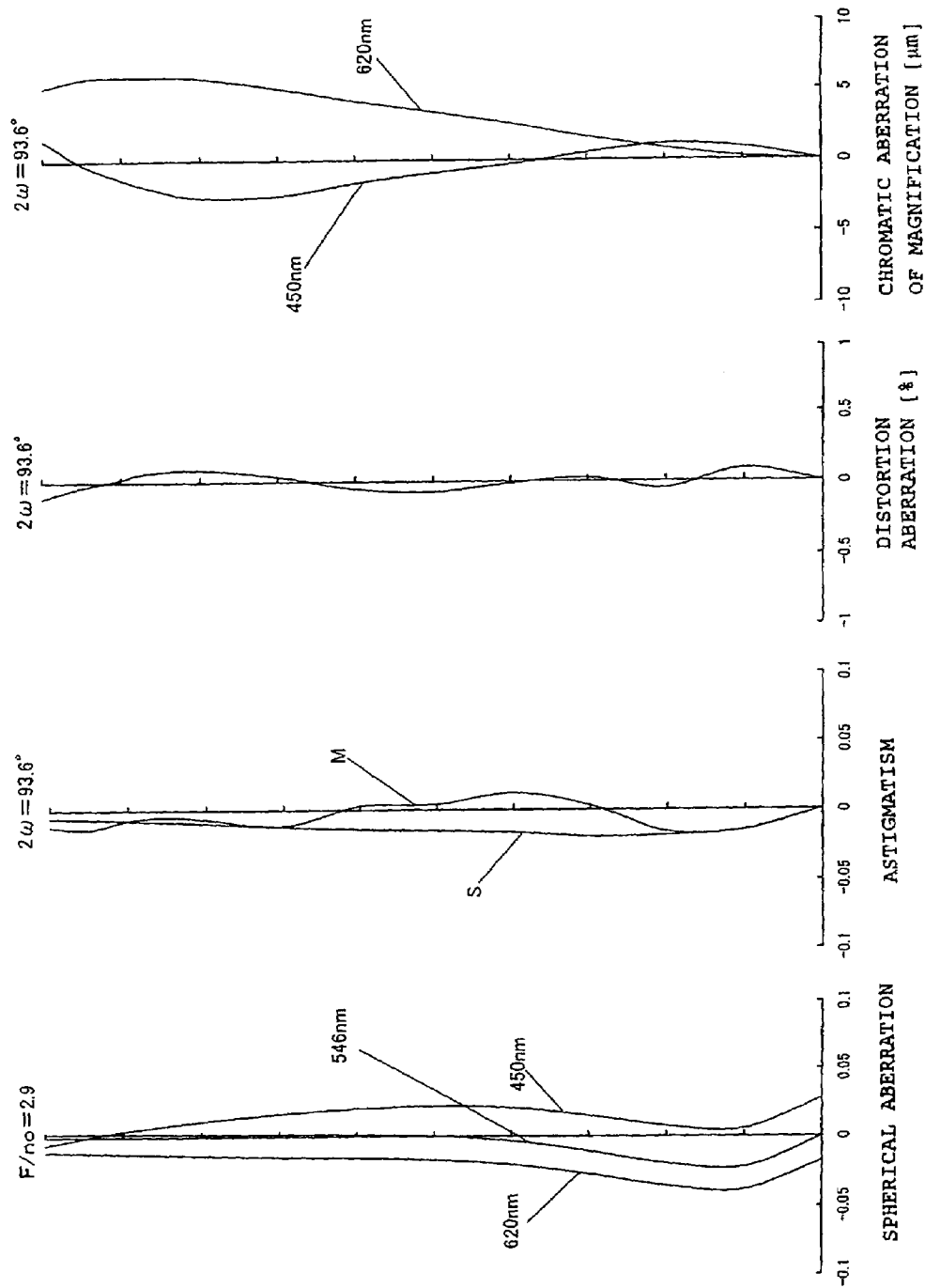
FIG. 23 is an aberration view showing spherical aberration, astigmatism, distortion aberration, and chromatic aberration of magnification of the projection lens of Example 8.
Figure 24:
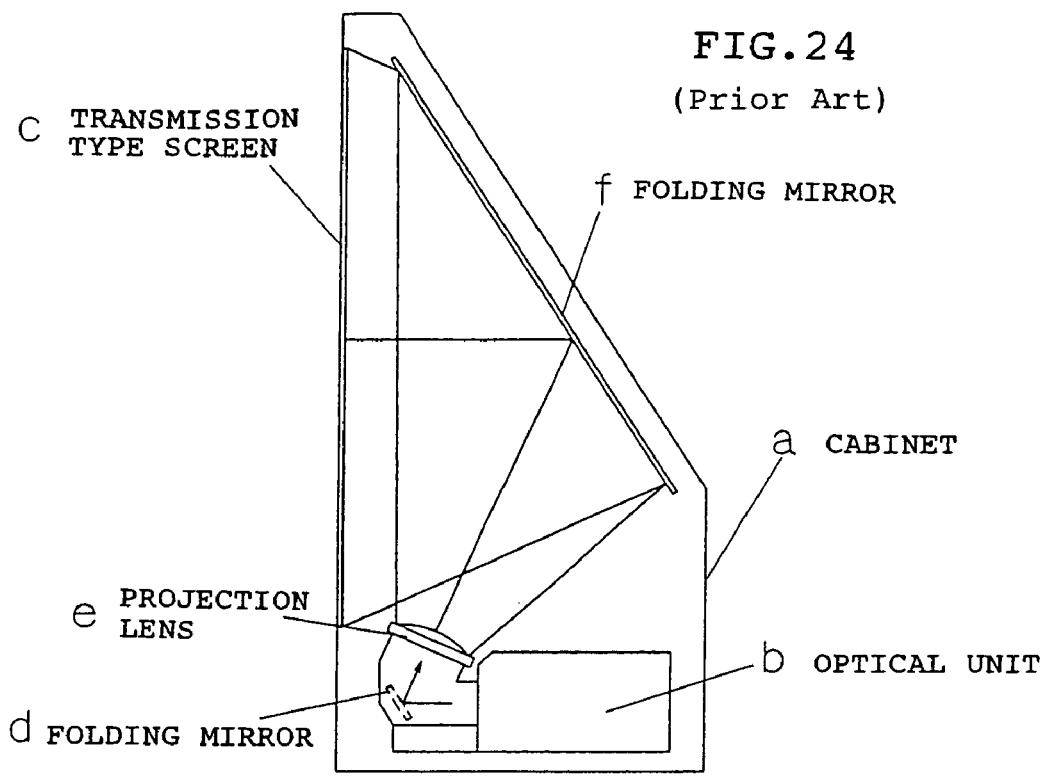
FIG. 24 is a sectional view showing an example of a conventional rear projection type image display apparatus.
Figure 25:
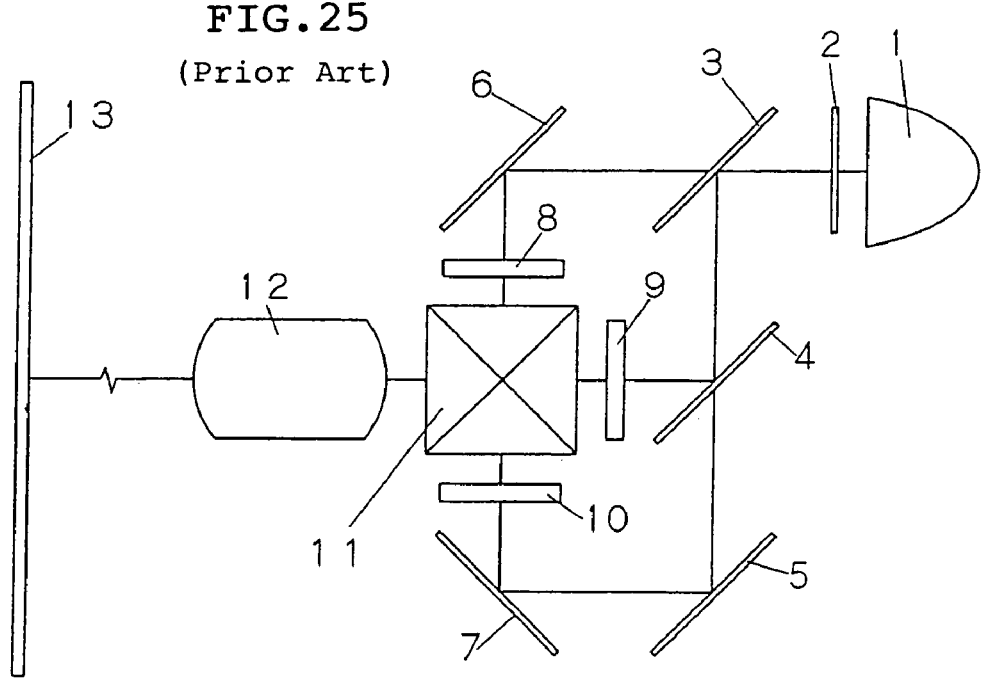
FIG. 25 is a schematic block diagram showing an example of an optical arrangement using a liquid crystal display device.

FIG. 22 shows the result of the lens design by the above-described setting, and FIG. 23 shows the result of the simulations of various kinds of the aberration in the lens design of FIG. 22. As can be seen from a graph in FIG. 23, good results are obtained in the spherical aberration, the astigmatism, the distortion aberration, and the chromatic aberration of magnification.

[D. Other Embodiments]

The optical path folding mirror M is provided in the above-described embodiments. However, even if the optical path folding mirror M is not provided, the same operation and effect as the above-described embodiments can be achieved.

In the embodiments, when the magnification is changed, not only the surface of the second lens L2 is changed but also the interval between the first group I and the second group II is changed by narrowing (or widening) the interval between the first group I and the second group II while the surface shape of the second lens L2 is changed to increase (or decrease) the negative refractive power. However, either change may be performed. Both the surface shape of the second lens L2 and the interval between the first group I and the second group II, or either the surface shape of the second lens L2 or the interval between the first group I and the second group II is appropriately changed according to a degree to which the magnification is increased.

In this case, the same operation and effect as the above-described embodiments can be achieved.

As can be seen from the descriptions of the above-described embodiments, the projection lens of the invention is not restricted by the kind of the image display device.

What is claimed is:

1. A projection lens which projects an image of an image display device on a surface of a screen, the projection lens, wherein
   a first group having a negative refractive power and a second group having a positive refractive power are arranged in order from a magnified side toward a reduced side,
   the first group is configured to arrange a first lens and a second lens in order from the magnified side, and the second group is configured to arrange a third lens to a seventh lens in order from the magnified side,
   the first lens is a negative meniscus lens whose both surfaces are formed by aspherical surface in which an area near an optical axis of the surface on the magnified side is a concave surface,
   the second lens is the negative meniscus lens whose both surfaces are formed by the aspherical surface in which the area near the optical axis of the surface on the magnified side is the concave surface,
   the third lens is a cemented lens in which a bi-concave lens is cemented to the surface on the reduced side of a bi-convex lens,
   the fourth lens is a positive meniscus lens whose both surfaces are formed by the aspherical surface, and a convex surface of the positive meniscus lens faces toward the reduced side,
   the fifth lens is the cemented lens in which the bi-concave lens is cemented to the surface on the reduced side of the bi-convex lens,
   the sixth lens is a positive lens whose strong convex surface faces toward the reduced side,
   the seventh lens is the positive lens whose both surfaces are a convex surface, and
   a stop is arranged between the first group and the second group.

2. The projection lens according to claim 1, wherein the first lens, the second lens, and the fourth lens are molded with a synthetic resin respectively, and Abbe numbers of these lenses v1, v2, and v4 satisfy v1, v2, and v4>54, and the Abbe numbers of the sixth and seventh lenses v6 and v7 satisfy v6 and v7>68.

3. The projection lens according to claim 1, wherein the negative refractive power of the first and second lenses and the positive refractive power of the fourth lens have values which suppress positional shift of back focus due to temperature change by canceling out each other.

4. The projection lens according to claim 1, wherein magnification is changed by changing the surface of the second lens or changing an interval between the first group and the second group.

5. The projection lens according to claim 1, wherein a condition of $9<f_4/|f_I|<17$ is satisfied when a focal distance of the first group is set to $f_I$ and the focal distance of the fourth lens of the second group is set to $f_4$.

6. The projection lens according to claim 1, wherein conditions of $2.5<B_{FL}/f$ and $1.1<f_{II}/|f_I|<\mathbf{1.7}$ are satisfied when the focal distance of the whole system is set to f, the back focus of the whole system is set to $B_{FL}$, the focal distance of the first group is set to $f_I$, and the focal distance of the second group is set to $f_{II}$.

7. The projection lens according to claim 1, wherein optical path folding means is provided between the first group and the stop.

* * * * *

UNITED STATES PATENT AND TRADEMARK OFFICE
CERTIFICATE OF CORRECTION

PATENT NO.      : 6,989,946 B2                                        Page 1 of 1
APPLICATION NO. : 10/995034
DATED           : January 24, 2006
INVENTOR(S)     : Kobayashi et al.

It is certified that error appears in the above-identified patent and that said Letters Patent is hereby corrected as shown below:

On Title Page Item (57) Col. 2,

Delete the original abstract and substitute the following new abstract:

Influence of temperature and aberrations is suppressed in a projection lens which projects an image onto a screen (magnified side) and which includes first and second negative refraction lenses and third to seventh positive refraction lenses arranged in order from the magnified side toward a reduced side. The first and second lenses are negative meniscus lenses with opposing aspherical surfaces, wherein the surface on the magnified side has a concave area near an optical axis. The third and fifth lenses are cemented lenses in which a bi-concave lens is cemented to the reduced side surface of a bi-convex lens. The fourth lens is a positive meniscus lens with opposing aspherical surfaces, one of which is a convex surface facing the reduced side. The seventh lens is a positive lens with opposing convex surfaces.

Signed and Sealed this

Fifteenth Day of August, 2006

JON W. DUDAS
*Director of the United States Patent and Trademark Office*